(12) United States Patent
Michini et al.

(10) Patent No.: US 11,885,759 B2
(45) Date of Patent: Jan. 30, 2024

(54) SOLAR PANEL INSPECTION USING UNMANNED AERIAL VEHICLES

(71) Applicant: Skydio, Inc., Redwood City, CA (US)

(72) Inventors: Bernard J. Michini, San Francisco, CA (US); Fabien Blanc-Paques, San Francisco, CA (US); Edward Dale Steakley, Cupertino, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 18/147,955

(22) Filed: Dec. 29, 2022

(65) Prior Publication Data

US 2023/0133257 A1 May 4, 2023

Related U.S. Application Data

(63) Continuation of application No. 17/483,249, filed on Sep. 23, 2021, now Pat. No. 11,567,019, which is a continuation of application No. 15/640,135, filed on Jun. 30, 2017, now Pat. No. 11,156,573.

(60) Provisional application No. 62/357,340, filed on Jun. 30, 2016.

(51) Int. Cl.
*G01N 25/72* (2006.01)
*H02S 50/10* (2014.01)

(52) U.S. Cl.
CPC .............. *G01N 25/72* (2013.01); *H02S 50/10* (2014.12)

(58) Field of Classification Search
CPC ................................ G01N 25/72; H02S 50/10
See application file for complete search history.

(56) References Cited

U.S. PATENT DOCUMENTS

| 8,818,572 | B1 * | 8/2014 | Tofte | G06Q 40/08 |
| | | | | 701/4 |
| 11,156,573 | B2 * | 10/2021 | Michini | G01N 25/72 |
| 11,567,019 | B2 * | 1/2023 | Michini | G01N 25/72 |
| 2011/0109740 | A1 * | 5/2011 | Guha | G06T 7/0004 |
| | | | | 382/165 |
| 2016/0004795 | A1 | 1/2016 | Novak | |
| 2018/0003656 | A1 | 1/2018 | Michini et al. | |

\* cited by examiner

*Primary Examiner* — David P Porta
*Assistant Examiner* — Meenakshi S Sahu

(57) ABSTRACT

Methods, systems, and program products of inspecting solar panels using unmanned aerial vehicles (UAVs) are disclosed. A UAV can obtain a position of the Sun in a reference frame, a location of a solar panel in the reference frame, and an orientation of the solar panel in the reference frame. The UAV can determine a viewing position of the UAV in the reference frame based on at least one of the position of the Sun, the location of the solar panel, and the orientation of the solar panel. The UAV can maneuver to the viewing position and point a thermal sensor onboard the UAV at the solar panel. The UAV can capture, by the thermal sensor, a thermal image of at least a portion of the solar panel. A server onboard the UAV or connected to the UAV can detect panel failures based on the thermal image.

20 Claims, 9 Drawing Sheets

FIG. 5

| SOLAR PANEL REPRESENTATION | DESCRIPTION | POSSIBLE DEFECTS |
|---|---|---|
| 502 — [308A] | PANEL OVERHEATING AS COMPARED WITH THE OTHER CELLS — 504 | PANEL IS NOT WORKING |
| 502 — [308B] | OVERHEATING PATTERN FOR A STRING OF CELLS — 504 | SHORT CIRCUIT IN A CELL STRING |
| 502 — [308C] | "PATCHWORK PATTERN" WHERE INDIVIDUAL CELLS ARE RANDOMLY DISTRIBUTED AND SIGNIFICANTLY HOTTER — 504 | PANEL IS NOT WORKING |
| 502 — [308D] | SIGNIFICANT OVERHEATING OF A PART OF A CELL — 504 | CELL RUPTURE |
| 502 — [308E] | UNEVEN HEAT PATTERN OR OVERHEATED AT SPECIFIC POINTS — 504 | CELL CRACK OR OTHER IMPEDIMENT |
| 502 — [308F] | OVERHEATING OF A SINGLE CELL — 504 | UNDETERMINED |

SOLAR PANEL INSPECTION USING UNMANNED AERIAL VEHICLES

CROSS-REFERENCE TO RELATED APPLICATION(S)

This application is a continuation of U.S. patent application Ser. No. 17/483,249, filed Sep. 23, 2021, which is a continuation of U.S. patent application Ser. No. 15/640,135, filed Jun. 30, 2017, which claims the benefit of U.S. Provisional Patent Application No. 62/357,340, filed Jun. 30, 2016, the entire disclosures of which are hereby incorporated by reference.

BACKGROUND

A solar panel can include multiple solar cells that convert solar energy into electricity. Efficiency of the conversion can depend on solar panel quality and installation quality. Solar panel quality can vary between manufacturers and product batches. Installation quality can depend on competence of an installer. Installed solar panels may age, causing a gradual loss of conversion efficiency. Various factors including, for example, lightning storms, hail damage, solar cell overheating, among others, can cause solar panels to crack, or cause components of a panel to fail, eventually affecting performance of the solar panels. As an example of environment factors affecting a solar panel, a temperature increase of 10 degrees Celsius above specified operating temperature of a solar panel can cause a 50-percent shortening of life of solar cells in the panel. Frequent inspection of the solar panels can aid maintenance of the panels.

Human inspection of solar panels can be costly and inefficient for utility-scale solar farms, as well as for distributed and randomly located solar installations (e.g., roof-top solar panel installations).

SUMMARY

Methods, systems, and program products of inspecting solar panels using unmanned aerial vehicles (UAVs) are disclosed. A UAV can obtain a position of the Sun in a reference frame, a location of a solar panel in the reference frame, and an orientation of the solar panel in the reference frame. The UAV can determine a viewing position of the UAV in the reference frame based on at least one of the position of the Sun, the location of the solar panel, and the orientation of the solar panel. The UAV can maneuver to the viewing position and point a thermal sensor onboard the UAV at the solar panel. The UAV can capture, by the thermal sensor, a thermal image of at least a portion of the solar panel. A server onboard the UAV or remotely connected to the UAV can detect panel failures based on the thermal image.

A UAV can determine a flight path that leads to a viewing position that is optimized for viewing a solar panel, given the orientation of the solar panel and position of the Sun in the sky. The UAV can capture a thermal image of the solar panel from the viewing position. The thermal image can be stored on the UAV or transmitted to a network server, or ground control station, for further processing to determine if the solar panel is not working or working abnormally. In some embodiments, some or all of the processing can be performed onboard the UAV. The UAV or network server can generate a report on the anomaly and the cause and send to a client server computer for review.

The UAV solar inspection techniques disclosed in this specification can be implemented to achieve one or more advantages. Compared to conventional solar panel inspections performed by technicians, the disclosed techniques can be performed more quickly, more efficiently, and more frequently. Solar panel inspection can be performed at regular intervals to assure optimal and continuous solar power production. The disclosed techniques are cost-effective for utility-scale solar farms, as well as for distributed and randomly located solar installations (e.g., roof-top solar panel installations).

The disclosed UAV solar panel inspection techniques allow a complete assessment of manufacturing defects and installation errors after installation. The disclosed techniques allow detection of defects that are invisible to human eyes. Compared to human inspections, the aerial inspection can be complete and detailed. The disclosed techniques allow for comparisons of solar panel performances over time (e.g., every year). The disclosed techniques can be safer than inspections that involve human participation, for example, in cases involving high voltage wiring or installations at high and difficult to reach places. The disclosed techniques can be used to prove whether installation of a solar panel is delivered free of defects after the installation completes. The disclosed techniques can help identify mismatched panels where higher performing modules are impeded by lower performing modules. The disclosed techniques can help identify overheated connections. When the inspection is done prior to expiration of the warranty, a solar panel user may timely replace or repair damaged or failed panels.

The details of one or more embodiments of the subject matter of this specification are set forth in the accompanying drawings and the description below. Other features, aspects and advantages of the subject matter will become apparent from the description, the drawings, and from the claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 5 is a diagram illustrating example techniques of identifying irregularities of a solar panel based on thermal imaging, according to an embodiment.

DETAILED DESCRIPTION

Figure 1:
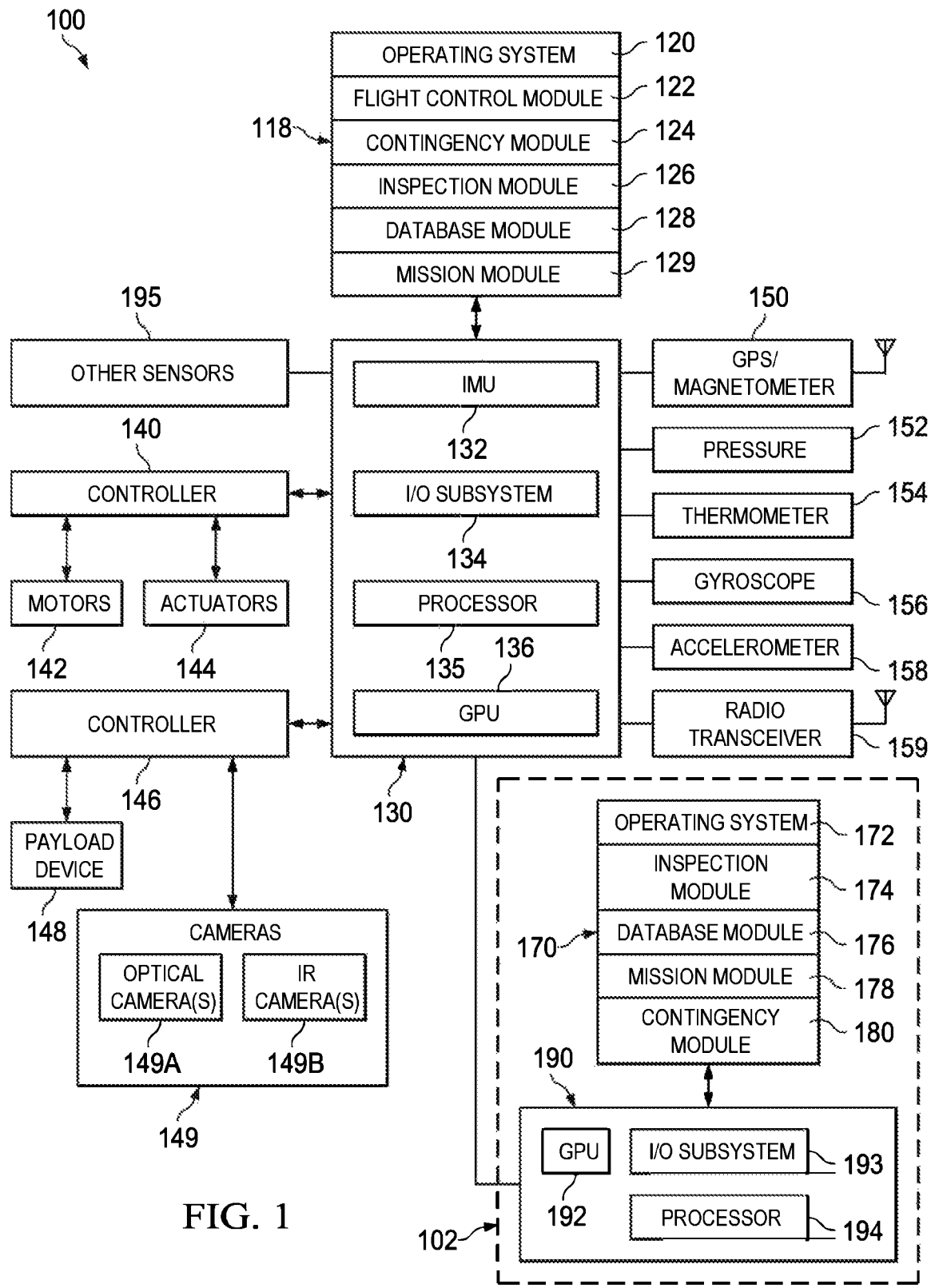
FIG. 1 is a block diagram of an example flight control system architecture for a UAV configured to perform solar panel inspection, according to an embodiment.

FIG. 1 is a block diagram of an example flight control system architecture for a UAV configured to perform solar panel inspection. A UAV can include a primary computer system 100 and a secondary computer system 102. The UAV primary computer system 100 can be a system of one or more computers, or software executing on a system of one or more computers, which is in communication with, or maintains, one or more databases. The UAV primary computer system 100 can include a processing subsystem 130 including one or more processors 135, graphics processing units 136, I/O subsystem 134, and an inertial measurement unit (IMU) 132. In addition, the UAV primary computer system 100 can include logic circuits, analog circuits, associated volatile and/or non-volatile memory, associated input/output data ports, power ports, etc., and include one or more software processes executing on one or more processors or computers. The UAV primary computer system 100 can include memory 118. Memory 118 may include non-volatile memory, such as one or more magnetic disk storage devices, solid-state hard drives, or flash memory. Other volatile memory such as RAM, DRAM, SRAM may be used for temporary storage of data while the UAV is operational. Databases may store information describing UAV flight operations, flight plans, contingency events, geofence information, component information and other information.

The UAV primary computer system 100 may be coupled to one or more sensors, such as GNSS receivers 150 (e.g., GPS receivers), thermometer 154, gyroscopes 156, accelerometers 158, pressure sensors (static or differential) 152, and other sensors 195. The other sensors 195 can include current sensors, voltage sensors, magnetometers, hydrometers, anemometers and motor sensors. The UAV may use IMU 132 in inertial navigation of the UAV. Sensors can be coupled to the UAV primary computer system 100, or to controller boards coupled to the UAV primary computer system 100. One or more communication buses, such as a controller area network (CAN) bus, or signal lines, may couple the various sensor and components.

Various sensors, devices, firmware and other systems may be interconnected to support multiple functions and operations of the UAV. For example, the UAV primary computer system 100 may use various sensors to determine the UAV's current geo-spatial position, attitude, altitude, velocity, direction, pitch, roll, yaw and/or airspeed and to pilot the UAV along a specified flight path and/or to a specified location and/or to control the UAV's attitude, velocity, altitude, and/or airspeed (optionally even when not navigating the UAV along a specific flight path or to a specific location).

The flight control module 122 handles flight control operations of the UAV. The module interacts with one or more controllers 140 that control operation of motors 142 and/or actuators 144. For example, the motors may be used for rotation of propellers, and the actuators may be used for flight surface control such as ailerons, rudders, flaps, landing gear and parachute deployment.

The contingency module 124 monitors and handles contingency events. For example, the contingency module 124 may detect that the UAV has crossed a boundary of a geofence, and then instruct the flight control module 122 to return to a predetermined landing location. The contingency module 124 may detect that the UAV has flown or is flying out of a VLOS from a ground operator, and instruct the flight control module 122 to perform a contingency action, e.g., to land at a landing location. Other contingency criteria may be the detection of a low battery or fuel state, a malfunction of an onboard sensor or motor, or a deviation from the flight plan. The foregoing is not meant to be limiting, as other contingency events may be detected. In some instances, if equipped on the UAV, a parachute may be deployed if the motors or actuators fail.

The mission module 129 processes the flight plan, waypoints, and other associated information with the flight plan as provided to the UAV in a flight package. The mission module 129 works in conjunction with the flight control module 122. For example, the mission module may send information concerning the flight plan to the flight control module 122, for example waypoints (e.g., latitude, longitude and altitude), flight velocity, so that the flight control module 122 can autopilot the UAV.

The UAV may have various devices connected to the UAV for performing a variety of tasks, such as data collection. For example, the UAV may carry one or more cameras 149. Cameras 149 can include one or more visible light cameras 149A, which can be, for example, a still image camera, a video camera, or a multispectral camera. The UAV may carry one or more infrared cameras 149B. Each infrared camera 149B can include a thermal sensor configured to capture one or more still or motion thermal images of an object, e.g., a solar panel. In addition, the UAV may carry a Lidar, radio transceiver, sonar, and traffic collision avoidance system (TCAS). Data collected by the devices may be stored on the device collecting the data, or the data may be stored on non-volatile memory 118 of the UAV primary computer system 100.

The UAV primary computer system 100 may be coupled to various radios, e.g., transceivers 159 for manual control of the UAV, and for wireless or wired data transmission to and from the UAV primary computer system 100, and optionally a UAV secondary computer system 102. The UAV may use one or more communications subsystems, such as a wireless communication or wired subsystem, to facilitate communication to and from the UAV. Wireless communication subsystems may include radio transceivers, infrared, optical ultrasonic and electromagnetic devices. Wired communication systems may include ports such as Ethernet ports, USB ports, serial ports, or other types of port to establish a wired connection to the UAV with other devices, such as a ground control station (GCS), flight planning system (FPS), or other devices, for example a mobile phone, tablet, personal computer, display monitor, other network-enabled devices. The UAV may use a lightweight tethered wire to a GCS for communication with the UAV. The tethered wire may be affixed to the UAV, for example via a magnetic coupler.

The UAV can generate flight data logs by reading various information from the UAV sensors and operating system 120 and storing the information in computer-readable media (e.g., non-volatile memory 118). The data logs may include a combination of various data, such as time, altitude, heading, ambient temperature, processor temperatures, pressure, battery level, fuel level, absolute or relative position, position coordinates (e.g., GPS coordinates), pitch, roll, yaw, ground speed, humidity level, velocity, acceleration, and contingency information. The foregoing is not meant to be limiting, and other data may be captured and stored in the flight data logs. The flight data logs may be stored on a removable medium. The medium can be installed on the ground control system or onboard the UAV. The data logs may be wirelessly transmitted to the ground control system or to the FPS.

Modules, programs or instructions for performing flight operations, contingency maneuvers, and other functions may be performed with operating system 120. In some implementations, the operating system 120 can be a real time operating system (RTOS), UNIX, LINUX, OS X, WINDOWS, ANDROID or other operating system 120. Additionally, other software modules and applications may run on the operating system 120, such as a flight control module 122, contingency module 124, inspection module 126, database module 128 and mission module 129. In particular, inspection module 126 can include computer instructions that, when executed by processor 135, can cause processor 135 to control the UAV to perform solar panel inspection operations as described below. Typically, flight critical functions will be performed using the UAV primary computer system 100. Operating system 120 may include instructions for handling basic system services and for performing hardware dependent tasks.

In addition to the UAV primary computer system 100, the secondary computer system 102 may be used to run another operating system 172 to perform other functions. The UAV secondary computer system 102 can be a system of one or more computers, or software executing on a system of one or more computers, which is in communication with, or maintains, one or more databases. The UAV secondary computer system 102 can include a processing subsystem 190 of one or more processors 194, GPU 192, and I/O subsystem 193. The UAV secondary computer system 102 can include logic circuits, analog circuits, associated volatile and/or non-volatile memory, associated input/output data ports, power ports, etc., and include one or more software processes executing on one or more processors or computers. The UAV secondary computer system 102 can include memory 170. Memory 170 may include non-volatile memory, such as one or more magnetic disk storage devices, solid-state hard drives, flash memory. Other volatile memory such a RAM, DRAM, SRAM may be used for storage of data while the UAV is operational.

Ideally, modules, applications and other functions running on the secondary computer system 102 will be non-critical functions in nature. If the function fails, the UAV will still be able to operate safely. The UAV secondary computer system 102 can include operating system 172. In some implementations, the operating system 172 can be based on real time operating system (RTOS), UNIX, LINUX, OS X, WINDOWS, ANDROID or other operating system. Additionally, other software modules and applications may run on the operating system 172, such as an inspection module 174, database module 176, mission module 178 and contingency module 180. In particular, inspection module 174 can include computer instructions that, when executed by processor 194, can cause processor 194 to control the UAV to perform solar panel inspection operations as described below. Operating system 172 may include instructions for handling basic system services and for performing hardware dependent tasks.

The UAV can include controllers 146. Controllers 146 may be used to interact with and operate a payload device 148, and other devices such as cameras 149A and 149B. Cameras 149A and 149B can include a still-image camera, video camera, infrared camera, multispectral camera, stereo camera pair. In addition, controllers 146 may interact with a Lidar, radio transceiver, sonar, laser ranger, altimeter, TCAS, ADS-B (Automatic dependent surveillance—broadcast) transponder. Optionally, the secondary computer system 102 may have controllers to control payload devices.

Figure 2:
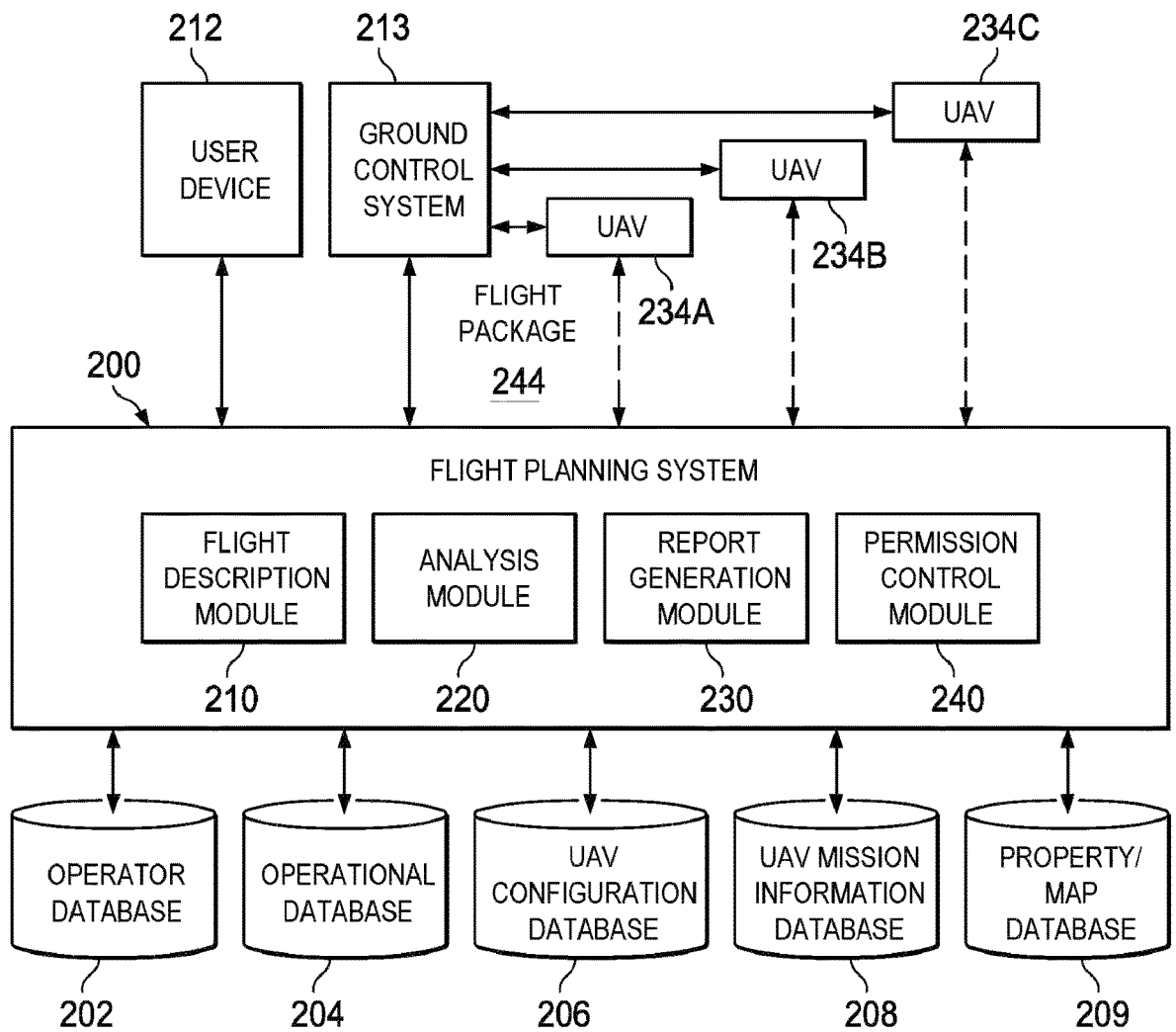
FIG. 2 is a block diagram illustrating an example flight planning system for a UAV configured to perform solar panel inspection, according to an embodiment.

FIG. 2 is a block diagram illustrating an example FPS 200. The various illustrated components may communicate over wired and/or wireless communication channels (e.g., networks, peripheral buses, etc.). FPS 200 can be a system of one or more computer processors, or software executing on a system of one or more computers. The FPS 200 can maintain and communicate with one or more databases (e.g., databases 202-209) storing information describing prior implemented flight plans and information associated with each flight plan (e.g., information describing a UAV, an operator, property/map, mission, database, and so on). The databases can include operator database 202, operational database 204, UAV configuration database 206, UAV mission information database 208 and property and map database 209.

The FPS 200 can be a system of one or more processors, graphics processors, logic circuits, analog circuits, associated volatile and/or non-volatile memory, associated input/output data ports, power ports, etc. FPS 200 can include one or more software processes executing on one or more processors or computers. The FPS 200 can be a component of, or be coupled to, one or more user devices 212 or a GCS 213. A user device 212 can be a device including one or more processors and configured to send data to and receive data from one or more UAVs 234A, 234B and 234C. A GCS 213 can be a specialized user device 212 configured to control one or more aspects of a flight of UAVs 234A, 234B and 234C.

The FPS 200 may store, and maintain, flight operation information associated with a UAV Flight operation information may include configuration information of each UAV, flight mission and planned flight path, operator information, the UAV's precise three-dimensional (3D) location in space, velocity information, UAV status (e.g., health of components included in the UAV), contingency plans, and so on. The FPS 200 can receive (e.g., from an operator), and determine, information describing a flight plan. The FPS 200 can provide a flight package 244 associated with the flight plan to a UAV (e.g., UAV 234A, 234B, 234C) to implement. Additionally, the FPS 200 can store flight plan information, flight data log information, job information in the various databases.

The example FPS 200 includes a flight description module 210 that can generate interactive user interfaces (e.g., HTML or XML content for web pages) for rendering on a user device (e.g., user device 212). The interactive user interfaces may optionally be transmitted for display to the user device via a wireless network or other communication channel. User device 212 can receive, from an operator, information describing a flight plan to be performed (e.g., by UAV 234A, 234B, or 234C).

To describe one or more locations where the flight plan is to be conducted, a user interface may be configured to receive, from an operator, location information associated with the flight plan (e.g., an address of a home or property, geospatial coordinates of a structure to be inspected, and so on). The flight description module 210 can obtain information describing the location. For instance, the information can include property boundaries associated with an address (e.g., boundaries of a home, obtained from a database, or system that stores or configured to access property boundary information), obstacles associated with the location (e.g., nearby trees, electrical towers, telephone poles) and/or other information. The flight description module 210 can obtain parameters for inspecting one or more solar panels, including, for example, locations of the one or more solar panels, orientation of the solar panels, configuration of the solar panels, and time and date for the inspection. Additionally, the flight description module 210 can obtain imagery, such as geo-rectified imagery (e.g., satellite imagery), associated with the entered location information. The flight description module 210 can include some or all of the information describing the location (e.g., the obtained imagery or boundary information) in an interactive user interface to be presented on the user device 212 to an operator.

The operator of the user device 212 may interact with user interfaces to describe a flight boundary geofence (as described further below) for a UAV to enforce. For instance, the user device 212 can receive imagery associated with operator-entered location information, and present one or more geofence shapes layered on the imagery. The user interface provides functionality for the operator to select a presented shape (e.g., a polygon), and further provides functionality enabling the operator to drag and/or drop the shape to surround an area of interest in the received imagery to limit allowable locations of a UAV to locations within the shape. Optionally, the user interface may allow the user device 212 to receive input (e.g., of a finger or stylus) tracing a particular shape onto a touch-screen display of the user device 212. The flight description module 210 can store information describing the trace as a flight boundary geofence. Accordingly, the user device 212 can provide information describing the traced shape to the flight description module 210 (e.g., coordinates associated with the imagery). The flight description module 210 can correlate the traced shape to location information in the real world as illustrated by the imagery (e.g., geospatial coordinates that correspond to the traced shape).

Similarly, a user interface can enable the operator to describe safe locations for a UAV to begin the flight plan (e.g., a launching location where the UAV takes off from the ground) and end the flight plan (e.g., a landing location where the UAV lands). As an example, the flight description module 210 can analyze the obtained imagery associated with the entered location information, and identify a geometric center of a convex area (e.g., a biggest convex area) within the geofence boundary that does not include obstructions (e.g., trees). For example, the flight description module 210 can determine an open area, such as an open pasture. Similarly, the flight description module 210 can obtain topographical information associated with the entered location information, and can detect substantially flat areas (e.g., areas with less than a threshold of variance in height). For instance, the flight description module 210 can determine that an open space (e.g., an open clearing that is substantially flat) is a safe launching location for the UAV to take-off from, and can provide information recommending the open space in an interactive user interface presented on the user device 212. Additionally, the flight description module 210 can analyze the obtained imagery and locate physical features that are generally known to be safe locations for take-off and landing. For example, the flight description module 210 can determine that a driveway of a home associated with the flight plan is a safe, and can select the driveway as a safe launching and landing location, or can recommend the driveway as a safe launching and landing location.

The flight description module 210 can receive (e.g., from a user interface) survey or flight mission information via a flight package, for instance information indicating a particular type of survey for a UAV to perform (e.g., damage inspection, inspection of a vertical structure, inspection of a solar panel, or inspection of a rooftop). The flight description module 210 can receive waypoints for the UAV to travel to, including an order in which the waypoints are to be traveled to, a ranking or importance of each, or a group of, waypoints, and specific actions for the UAV to take while traveling to, or after reaching, each waypoint. For instance, a user interface can optionally enable the operator using the user device 212 to specify that upon reaching a particular waypoint, the UAV is to activate a particular sensor, or other payload devices, such as an infrared camera, a sensor measuring radiation, and so on. Additionally, a user interface can optionally enable the operator to specify transition speeds the UAV is to use when travelling between waypoints, or between particular waypoints.

In addition to the navigation of the UAV to the waypoints, operations to be performed at a particular location, or waypoint, may be identified by an operator using the FPS 200 or GCS 213 via a user interface. The user interface can allow an operator to inspect a specified location photographically. Operations of the UAV may be automatically configured by either the FPS 200 or GCS 213 depending on the type of inspection to be performed.

The flight description module 210 can receive information describing, or relevant to, configuration information of a UAV, such as a type of UAV (e.g., fixed-wing, single rotor, multi-rotor, and so on). In addition, the flight description module 210 can receive information describing, or relevant to, configuration information of sensors or other payload devices required for the survey or flight mission information, and general functionality to be performed. The flight description module 210 can then determine recommendations of particular UAVs (e.g., UAVs available to perform the flight plan) that comport with the received information. Similarly, the flight description module 210 can determine that, based on the received survey type, a UAV will require particular configuration information, and recommend the configuration information to the operator. For instance, the flight description module 210 can receive information identifying that hail damage is expected, or is to be looked for, and can determine that a UAV that includes particular sensors, and specific visual classifiers to identify hail damage, is needed. For example, the flight description module 210 can determine that a heat and/or thermal imaging sensor that includes specific visual classifiers that can distinguish hail damage of solar panels from other types of damage (e.g., wind damage, rain damage, and so on) is needed.

The flight description module 210 can utilize received survey or flight mission information to determine a flight pattern for a UAV to follow. For instance, the flight description module 210 can determine a path for the UAV to follow between each waypoint (e.g., ensuring that the UAV remains in the geofence boundary). Additionally, the flight description module 210 can determine, or receive information indicating a safe minimum altitude for the UAV to enforce, the safe minimum altitude being an altitude at which the UAV is safe to travel between waypoints. The safe minimum altitude can be an altitude at which the UAV will not encounter obstacles within the geofence boundary (e.g., a height above buildings, trees, towers, poles and so on). Similarly, the safe minimum altitude can be based on a ground sampling distance (GSD) indicating a minimum resolution that will be required from imagery obtained by the UAV while implementing the flight plan (e.g., based in part on capabilities of an included camera, such as sensor resolution, sensor size, and so on).

The flight description module 210 can receive a time that the flight plan is to be performed (e.g., a particular day, a particular time at a particular day, a range of times, and so on). The flight description module 210 can then determine an availability of UAVs and/or operators at the received time(s). For example, the flight description module 210 can obtain scheduling information. Additionally, the flight description module 210 can filter available UAVs according to determined configuration information (e.g., as described above). Optionally, the flight description module 210 can access weather information associated with the received time(s), and determine an optimal time or range of times for the job to be performed. For instance, a UAV that includes particular sensors (e.g., electro-optic sensors) can obtain better real-world information at particular times of day (e.g., at noon on a sunny day can provide better imagery by maximizing image contrast and minimizing the effects of shadows). The flight description module 210 can determine the flight plan accordingly.

The FPS 200 can provide the determined flight plan as a flight package 244 directly to a UAV (e.g., the UAV 234A, 234B or 234C). Optionally, the FPS 200 can provide the flight package 244 to a user device 212 or GCS 213. The user device 212 or GCS 213 can modify the flight plan or preserve the flight plan in the flight package 244 as received. The user device 212 or GCS 213 can transmit the flight package 244 to the UAV 234A, 234B or 234C. Optionally, the flight package 244 can include a flight manifest file (e.g., an XML, file) identifying necessary application and version information to conduct the flight plan. For instance, the UAV can be required to execute a particular application (e.g., "app" downloaded from an electronic application store) that provides functionality necessary to conduct the flight plan. As an example, an application can effect a flight plan associated with inspecting vertical structures, and the UAV can be required to execute the application prior to initiation of the flight plan.

In particular, the FPS 200 may create a flight plan for automated or partially automated flight of a UAV, taking into consideration of location of a solar panel, a position of the Sun at given time of day, and an orientation of the solar panel. The FPS 200 may create a flight plan that directs the UAV to a viewing position that is optimal for inspecting the solar panel.

The FPS 200 may receive, via a user interface, a location for an aerial survey to be conducted by an unmanned aerial vehicle. One or more images may be displayed depicting a view of the location. The interface allows for a selection of a launching location of the UAV. As the images have associated geospatial positions, the FPS 200 can determine an associated latitude/longitude for the launching location. The user interface may receive an input or selections for one or more flight waypoints. Similar to the launching locations, the flight waypoints having an associated geospatial position. The FPS 200 may assign altitudes for the flight waypoints, or altitudes for the flight waypoints may be determined by a user, and specific numeric altitudes values may be set.

The FPS 200 may determine based on the launching location and altitude of the one or more flight waypoints whether a flight waypoint may cause a non-VLOS occurrence. From the launching location, a flight plan may be generated using waypoints having an associated latitude and longitude coordinates, and an associated altitude. The FPS 200 may not allow a UAV waypoint where the VLOS from the base location (e.g., the launching location, or an area around the launching location), upon determining that the waypoint would be blocked because of a structure. The FPS 200 may use 3D polygonal data, topographical data or other structure data in generating the flight plan. The system can use a 3D coordinate system to determine, based on a base location and each waypoint location, whether the UAV would likely enter into a non-VLOS situation. The flight planning system 200 can then generate flight plan that avoids the non-VLOS situation, and including only the flight waypoints that would not cause a non-VLOS occurrence.

The flight planning system 200 may present, via an interface, one or more recommended launching locations for the UAV that provides an operator an ideal location to obtain a best or maximum VLOS when operating the UAV around a structure. Lines from multiple points on the flight path, for example from each waypoint, at the flight path altitude can be computed and projected to various point locations on the ground. Point locations on the ground where the lines from the points on the flight path that do not intersect the structure may be identified as an ideal location for the operator with VLOS vantage point, making the location suitable as a launching location. A recommended launching location may be selected by the user, and the launching location is used as part of a primary flight plan. Additionally, a backup launching location with a secondary (an alternative) flight plan may be created. There may be situations when arriving at a survey site, that a physical inspection proves that the launching location of the primary flight plan is unsuitable. For example, foliage, trees, plants, new structures, etc. not shown in an aerial image used to plan the survey may now be present. These plants and structures may block the UAV from safely ascending to an inspection altitude. While at the inspection site, the operator of the GCS 213 may then select the secondary flight plan and launching location to conduct the inspection. Both the primary flight plan, and the secondary flight plans with the alternative launching locations may be transmitted by the flight planning system 200 to the GCS 213 or directly to a UAV. While the FPS 200 is configured to perform operations described for determining a launching location to provide ideal VLOS, the user device 212 or GCS 213 may also perform the operations described for selecting a launching location and waypoints to provide VLOS while operating a UAV.

Additionally, the FPS 200 may determine a geofence boundary to limit flight of the UAV to a bounded area. The user interface may display the geofence boundary over one or more location images. Additionally, the FPS 200 may determine a survey area, and set the survey area within the geofence boundary.

The FPS 200 then receives, from a GCS 213 (or directly from the UAV), flight log data and collected sensor data after the UAV has conducted the flight plan. A user interface of the FPS 200 then displays at least a portion of sensor data collected by the UAV, and information associated with the flight data package.

Similar to the FPS 200, the GCS 213 may also be used for flight and contingency planning. The GCS 213 can receive flight plans from the FPS 200 for transmission to the UAV. The GCS 213 also allows for manual override of a UAV operating in an autopilot mode. A flight plan may be transmitted to the UAV either via a wireless or tethered connection. Ideally, the GCS 213 is a mobile device, such a laptop, mobile phone, tablet device, with a cellular and other wireless connection for data transmission over the Internet or other network.

Each of user device 212, including specialized user device 212 designated as GCS 213, can be a system of one or more computers, or software executing on a system of one or more computers, which is in communication with, or maintains, one or more databases, e.g., databases, storing information describing UAV flight operations and components. Each of user device 212 can be a system of one or more processors, graphics processors, logic circuits, analog circuits, associated volatile and/or non-volatile memory, associated input/output data ports, power ports, etc. Each of user device 212 can include one or more software processes executing on one or more processors or computers.

Although in one embodiment of the invention, the FPS 200 may be primarily used to create and transmit a flight package 244 to a UAV or GCS 213, the UAV or GCS 213 can initiate the request for a flight package 244 from the FPS 200. An operator may take the UAV or GCS 213 to a property location. The UAV or GCS 213 may then request a flight package, or an updated flight package using a current position of the UAV or GCS 213. For example, the UAV or GCS 213 can determine its geospatial position via a GNSS receiver (using GPS, GLONASS, Galileo or Beidou system). The UAV or GCS 213 can then transmit its location to the FPS 200, along with other identifying information about the requesting device, such as its unique identifier (UID), or media access control (MAC) address, etc. The FPS 200 will receive the request, and determine if an updated or changed flight package exists by comparing the device identifier with identifiers in a database storing the new or updated flight package information. If FPS 200 finds a new or updated flight package, then the FPS 200 transmits the flight package from the FPS 200. The UAV or GCS 213 can receive the flight package. A confirmation acknowledging receipt of the flight package may then be transmitted from the UAV or GCS 213 to the FPS 200. The FPS 200 will then update a database record to indicate that the particular flight package has been received. Moreover, the UAV or GCS 213 can supply the property location, and a new job request can be sent to the FPS 200. The FPS 200 may create a new flight package for the UAV or GCS 213.

For autonomous flight of a UAV (e.g., UAV 234A, 234B, or 234C), a flight plan may be created and transmitted to the UAV. The flight plan instructs the UAV with regard to a particular flight path. A flight plan may be created using a FPS 200, or a GCS 213. A flight plan instructs the UAV where it should fly in a 3D space. The flight plan includes a series of connected waypoints that define where the UAV should fly and what actions that the UAV should complete during a particular flight. The UAV may have an autopilot flight module operating on a UAV computer system that uses the flight plan to fly the UAV automatically. The flight plan information may be provided to the GCS 213 and then to the UAV or directly to the UAV, in a flight package 244 comprising the flight plan and other information (such as contingency event instructions).

Using the FPS 200, or GCS 213, a UAV operator may select a series of geographically based waypoints and a launching location for the UAV. Based on the waypoints, a flight plan may be constructed allowing the UAV to autonomously navigate itself autonomously. In some implementations, the FPS 200 or GCS 213 may automatically define a flight plan based on various criteria, such as an inspection type.

While the UAV computer system autopilot module is navigating the UAV according to a flight plan, certain aspects of the flight pattern may be controlled by the operator's user device 212. The flight plan or pattern may be configured such that for a particular waypoint, a vertical ascent/descent rate, UAV altitude, horizontal UAV rotation, payload gimbal, payload direction, waypoint transition speed, or trigger of a payload sensor may be controlled by the operator. The user device 212 may have a physical control device such as a toggle or joystick, or virtual control in a user interface that allows the operator to control vertical ascent/descent rate, UAV altitude, UAV attitude, horizontal UAV rotation, payload gimbal, payload direction. The user device 212 can trigger a payload sensor while conducting the inspection. For example, the UAV may navigate via autopilot to a position over an inspection location. An operator then can provide input to the user device 212. The user device may transmit a signal or information corresponding to the user input to the UAV via radio communication. The signal or information can control the vertical ascent/descent rate, UAV altitude, UAV attitude, horizontal UAV rotation, payload gimbal, or payload direction, or waypoint transition speed. The signal or information to can trigger a payload sensor to turn on or turn off. This particular mode allows for partial autopilot control and partial or complete manual control of the UAV. Even though the operator may manually control certain aspects of the flight plan, if one has been set, the UAV can remain within a geofence boundary envelope and to remain within VLOS of the operator operating user device 212.

In another example, the UAV may be partially manually controlled by an operator using the user device 212 while the UAV is in autopilot mode. The UAV may receive a command from the user device 212 to nudge the UAV in a particular direction. In this case, the control input of the user device 212 causes the user device 212 to send a command to the UAV, instructing the UAV to move slightly, for example between 0.1 to 3 meters, in a particular direction (in an x, y, or z axis, or diagonally). The particular distance can be predetermined, or be variable based on the proximity to a structure. Nudging the UAV allows the operator to move the UAV away from the structure if the operator sees that the UAV flying too close to the structure. The nudge command may be provided any time to the UAV while it is operating in an auto-piloted mode. The UAV should still enforce geofence boundaries (if one has been set) and not allow a nudge to cause the UAV to move beyond a geofence boundary envelope.

The FPS 200 can include an analysis module 220, a report generation module 230 and a permission control module 240. The analysis module 220 is configured to analyze a flight plan and determine one or more portions of a flight path for capturing visible and infrared images of one or more solar panels, one or more viewing positions on the flight path, and orientation of sensors for capturing the images. The report generation module 230 is configured to generate one or more flight reports. The flight reports can include flight data (e.g., path, duration and actions of control surfaces), sensor data (e.g., air pressure, temperature and humidity), and payload data (e.g., information gathered by a payload camera). In particular, the report generation module 230 can generate a report on a solar panel inspected by the UAV. The permission control module 240 is configured to impose one or more limits on flights of the UAV. The limits can include, for example, that the UAV shall stay inside or outside an envelope defined by geofences or by geographic coordinates, or that the UAV shall stay within VLOS of a base location (e.g., a location of user device 212). In some implementations, the report generation module 230 can generate a report based on results of data analysis performed on collected data. For example, the report generation module 230 can generate a report can generate a status report on one or more inspected solar panels based on thermal images captured by a thermal sensor of a UAV.

Figure 3:
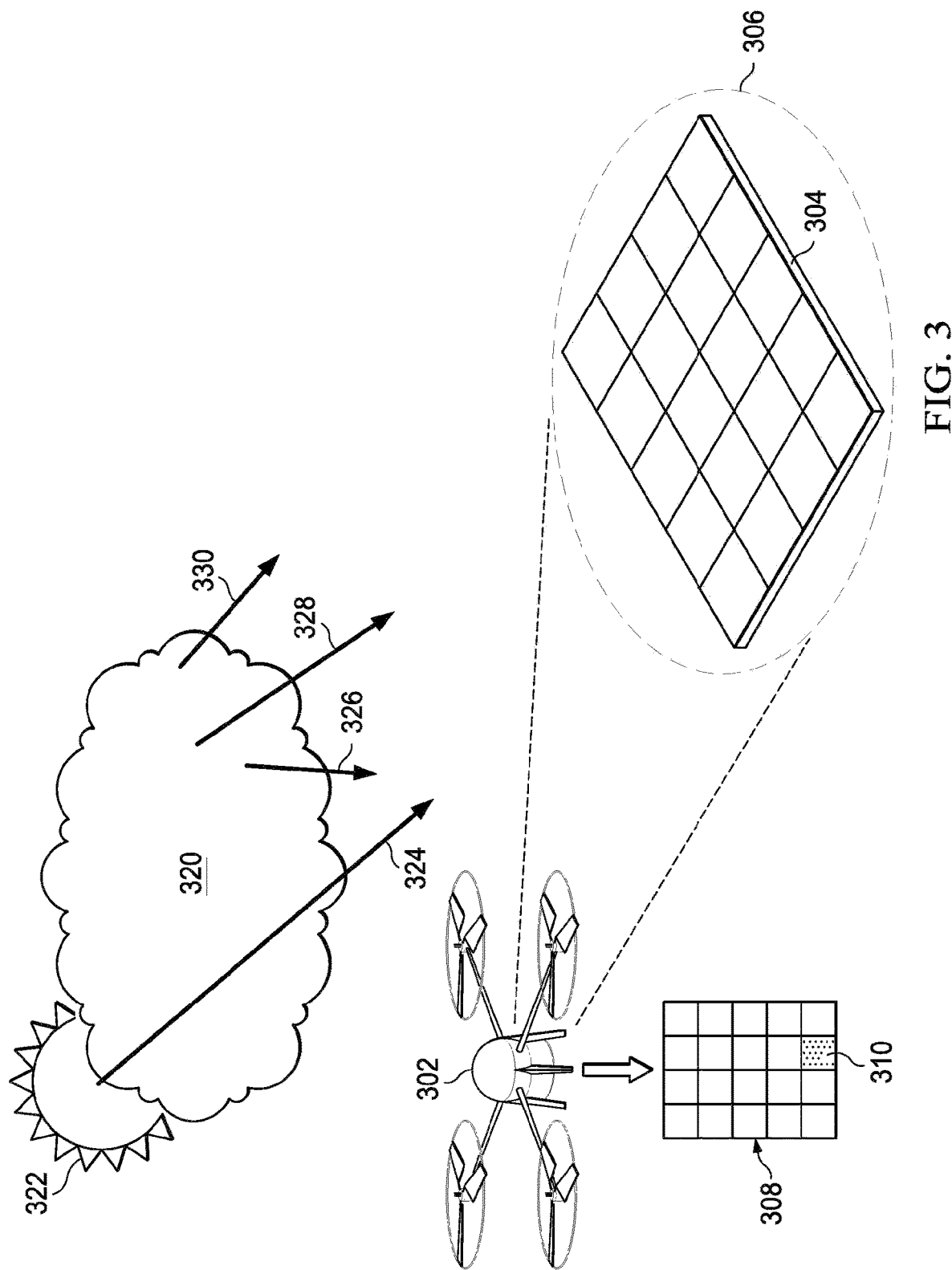
FIG. 3 provides an overview of example techniques of solar panel inspection, according to an embodiment.

FIG. 3 provides an overview of example techniques of solar panel inspection, according to an embodiment. Example UAV 302 is configured to inspect one or more solar panels automatically and autonomously, once programmed. UAV 302 can be a UAV having an architecture described in reference to FIG. 1. UAV 302 can operate under a flight plan of FPS 200, with or without control from GCS 213 (of FIG. 2).

UAV 302 can receive a job or flight package with a flight plan for autonomous inspection of a solar panel 304 array or multiple solar panel arrays. The job or flight package can be received through FPS 200 or GCS 213, or received directly at UAV 302. The request can specify one or more solar panel 304 for inspection, or a portion or an entire solar array farm. Solar panel 304 can be a stand-alone panel or a panel of a solar farm. Solar panel 304 can include one or more solar cells configured to convert solar energy to electricity.

UAV 302 can fly to a viewing position that is an optimal position for observing solar panel 304. The UAV 302 can determine the optimal position using various techniques, examples of which are described below in reference to FIG. 4. At the viewing position, UAV 302 can capture one or more thermal images of area 306 that includes solar panel 304. UAV 302 can capture the thermal images using a thermal sensor, e.g., infrared camera 149B of FIG. 1. The thermal sensor can be mounted on a pointing device, e.g., a gimbal device, that can point the thermal sensor to solar panel 304 from the viewing position.

UAV 302 can have various sensors for recording environment factors that may affect inspection of solar panel 304. For example, UAV 302 can have a solar irradiance sensor configured to acquire baseline solar irradiance data, an anemometer configured to measure wind speed, and a thermometer for measuring ambient temperature. The thermometer may be located distally from the UAV electronics to obtain a more accurate ambient temperature, for example on the top portion of the body of the UAV. The UAV may also derive wind speed without an anemometer based on the power used by each motor to maintain a position, or correct for wind drift. Also, the UAV can determine wind speed by tracking ground speed without correcting for wind. UAV 302 can calibrate the thermal image using measurement readings of the sensors. UAV 302 can log the sensor readings, e.g., the baseline solar irradiance data, the wind speed, or the temperature, to the thermal image for use in post-capture processing for generating, for example, thermal maps 308. In some implementations, UAV 302 can use a visible light camera, e.g., camera 149A of FIG. 1 as the solar irradiance sensor. In some implementations, UAV 302, or a server, can calibrate the thermal image based on a marker, e.g., a gray card, placed on a solar panel to be inspected.

In some implementations, UAV 302 can point the visible light camera toward the sky to capture an image of the sky and use pattern recognition to determine if clouds 320 are present in front of the Sun 322. For example, in an embodiment UAV 302 can detect, from the visible light image, shadows on solar panel 304. When clouds 320 completely or partially block sunlight 324, diffused light 326, 328 and 330 may affect the thermal image of solar panel 304. UAV 302 can tag the visible light image of the sky to the thermal image for use in post processing, during which the effects of clouds 320 are accounted for. In some implementations, UAV 302 can determine if a shadow of clouds 320 is on solar panel 304. Upon determining that the shadow is on solar panel 304, UAV 302 can track the shadow while maneuvering, and wait for the shadow to leave solar panel 304 before capturing a thermal image of solar panel 304.

The UAV 302 can also determine whether the UAV is in the shadow of a cloud by determining a brightness level using the irradiance sensor. A base value can be established such that a decrease in the measured value as compared to the base value would indicate that the UAV is in the shadow of a cloud. While not determinative as to a solar panel, it may be likely that an inspected solar panel is also in the shadow of the cloud. A cloud for example, could shadow the UAV, but not necessarily the solar panel being inspected. The UAV 302 may wait to obtain sensor data until the UAV determines that the UAV 302 is not in the shadow of the cloud.

Figure 4:
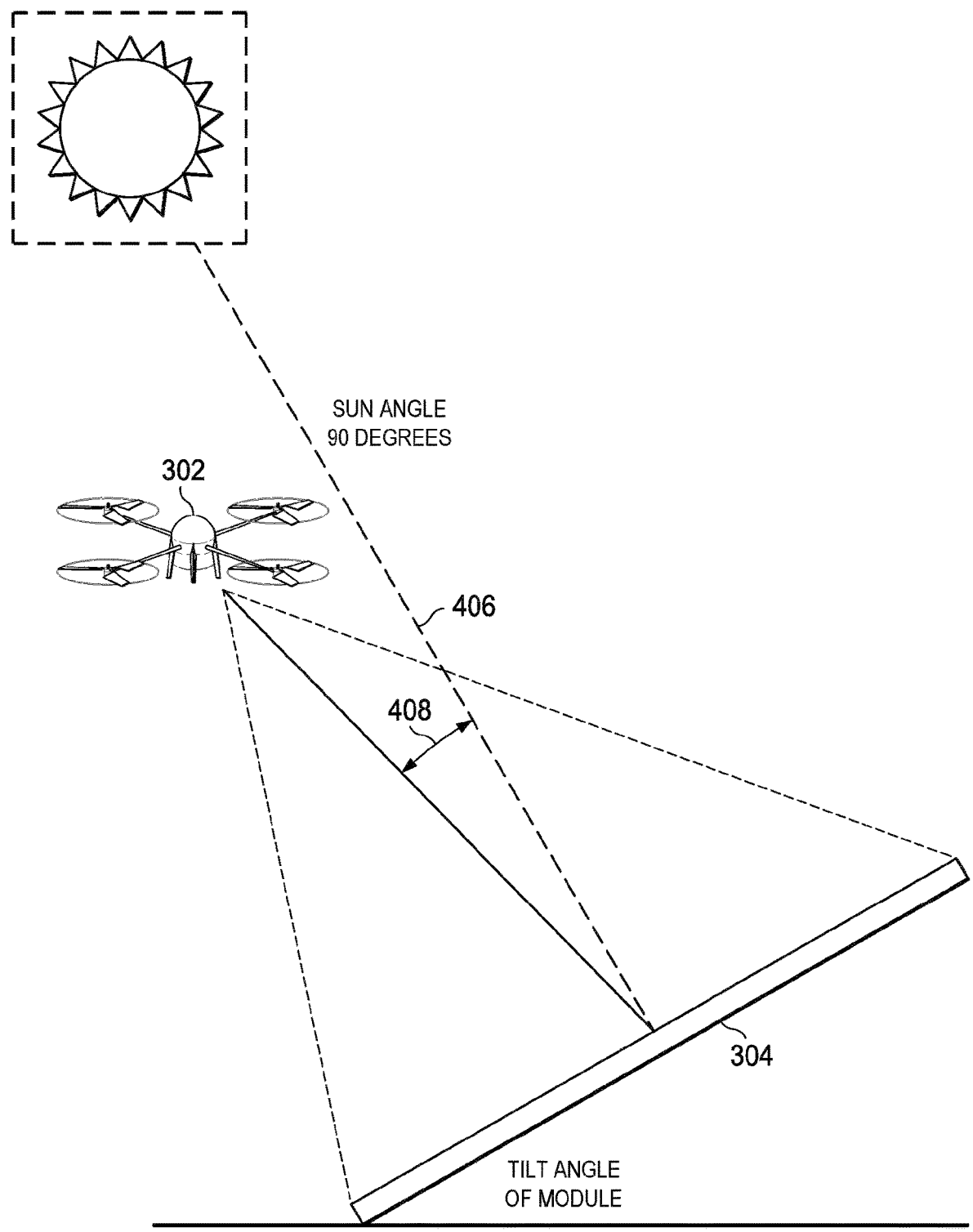
FIG. 4 illustrates example techniques of determining a viewing position of a UAV and a sensor orientation for inspecting a solar panel, according to an embodiment.

UAV 302 can use various techniques to determine the direction of the Sun relative to the UAV and to solar panel 304. For example, UAV 302 can determine, based on time of day and an orientation of solar panel 304, a viewing as shown in FIG. 4. In some implementations, UAV 302 can use a visible light camera, e.g., camera 149A of FIG. 1, to detect a position of the Sun and calculate the angle based on the determined Sun position. UAV 302 can tag the angle to the thermal image for use in post processing.

In an embodiment, UAV 302 can fly close to solar panel 304 and use an anemometer (or other techniques to approximate the wind speed) to measure wind speed across solar panel 304. Wind can provide a cooling effect on solar panel 304, causing thermal measurement error. UAV 302 can be programmed to fly to within a threshold distance (e.g., five meters) of solar panel 304 to measure the wind speed. UAV 302 can then fly back up to the viewing position to capture the thermal images. UAV 302 can tag the thermal image with the wind speed data.

UAV 302, or a server in communication with UAV 302 (e.g., a cloud-based server or a computer onboard UAV 302) can determine one or more thermal maps 308 from the captured thermal images. Thermal maps 308 can include normalized thermal images where various orientations of solar panel 304 are adjusted. In addition, UAV 302 or the server can normalize thermal maps 308 using the tags, e.g., by calibrating a temperature distribution using the tagged data, including increasing the temperature W degrees when wind speed is X meters per second, or increasing the temperature by C degrees when clouds 320 block Y percent of sunlight 324. UAV 302 or the server can determine respective temperatures of solar cells in solar panel 304 from the thermal maps 308. Based on the respective temperatures, UAV 302 or the server can determine whether any solar cell is overheating. UAV 302 or the server can then determine whether any solar cell, or solar panel 304 as a whole, is working according to specification, or has failed. In the example shown, UAV 302 or the server can determine whether one or more cells, e.g., cell 310, is overheating. UAV 302 or the server can estimate a cause of failure of cell 310 or of solar panel 304, and generate a report on the failure and the cause.

In the example of FIG. 3, a single UAV 302 and a single solar panel 304 are shown. In various implementations, multiple UAVs 302 can be used to inspect multiple solar panels. For example, for solar farms where multiple solar panels 304 are arranged in rows and columns (or in circles), two or more UAVs 302 can inspect the solar panels. FPS 200 or GCS 213 can plan solar panel inspection missions to maximize number of inspections in a given period of time, based on the position of the Sun, the environment factors, and arrangement of the solar panels. For example, UAVs 302 or FPS 200 can determine which rows of solar panels 304 will be receiving direct sunlight or be in shadow at certain time of the day. UAVs 302 (or FPS 200 or GCS 213) can select rows for inspection based on this data. In some implementations, UAVs 302 (or FPS 200 or GCS 213) can simulate Sun trajectory and incident angle. UAVs 302 can tag the thermal images with the trajectory and incident angle for processing. In some implementations, UAVs 302 can be programmed to fly inspection missions in morning or evening when ambient temperatures are relatively low compared to noon, to ensure contrast in the thermal images is sufficient to make overheating elements stand out from other components of solar panel 304.

Determining Inspection Time and Viewing Position

FIG. 4 illustrates example techniques of determining a viewing position of UAV 302 and a sensor orientation for inspecting solar panel 304. UAV 302 can be programmed to perform an inspection at a time when the ambient conditions are at or below a particular humidity level, or during a sparse or cloud-free day for inspecting the solar panel 304, to avoid specular reflections of clouds on the solar panels. The day and time can be based on weather information. For example, UAV 302 or FPS 200 can request and receive weather data from a weather service. Alternatively or additionally, UAV 302 can obtain weather information during flight. The weather information can include, for example, whether a particular day and time is sunny, wind speed of the day and time, and temperature of the day and time.

UAV 302 or FPS 200 can select a day and time that, according to the weather information, is sunny and dry, or at or below a particular humidity level. When a request for inspection does not specify a date or time, or when the request allows the inspection to be performed and one or more optional time slots, UAV 302 or FPS 200 can automatically choose a day and time that is sunny and dry for inspection. When the inspection is required to be done on a certain day or at a certain time, UAV 302 can determine, e.g., while in flight, whether solar irradiance satisfies a minimum solar irradiance threshold. The minimum solar irradiance threshold can be a value (e.g., 650 watts per square meter) above which UAV 302 will perform the inspection. Upon determining that a solar irradiance is above this threshold, UAV 302 can perform the inspection. Upon determining that the solar irradiance is below this threshold, UAV 302 can return to base or inspect other solar panels at a different location. If UAV 302 performs the inspection on a cloudy day, UAV 302 can tag an image of the clouds to the thermal images captured on that day to correct effects of the clouds and specular reflections.

In addition, UAV 302 or FPS 200 can select a day and time that, according to the weather information, is calm and not windy. When a request for inspection does not specify a date or time, or when the request allows the inspection to be performed and one or more optional time slots, UAV 302 or FPS 200 can automatically choose a day and time that is not windy for inspection. When the inspection is required to be done on a certain day or at a certain time, UAV 302, UAV 302 can determine, e.g., while in flight, whether wind speed reaches a maximum wind speed. The maximum wind speed can be a threshold value (e.g., five meters per second) above which UAV 302 will defer the inspection. Upon determining that a wind speed is above this threshold, UAV 302 can wait for the wind to calm down, or return to base or inspect other panels at a different location. Upon determining that the wind speed is below this threshold, UAV 302 can perform the inspection. If UAV 302 performs the inspection on a windy day, UAV 302 can log wind speed when the thermal images are obtained. The wind speed may then be used later for the respective thermal images to correct or account for the cooling effect of the wind for the solar panels.

In addition, UAV 302 or FPS 200 can select a day and time that, according to the weather information, is at or below a preferred ambient temperature. When a request for inspection does not specify a date or time, or when the request allows the inspection to be performed and one or more optional time slots, UAV 302 or FPS 200 can automatically choose a day and time that may be within a temperature range suitable for inspection. For example, weather forecasts may indicate that for a particular area the temperature for a particular day, or at certain times of the day, would not be suitable to operate the UAV. When the inspection is required to be done on a certain day or at a certain time, UAV 302, UAV 302 can determine, e.g., while in flight, whether a measured temperature reaches a maximum ambient temperature. The maximum ambient temperature can be a threshold value (e.g., 40 degrees Celsius) above which UAV 302 will defer the inspection. Upon determining that an ambient temperature is above this threshold, UAV 302 can defer the inspection, and return to land a predetermined landing location. Upon determining that the ambient temperature is, or remains, below this threshold, UAV 302 may continue and perform the inspection. If UAV 302 performs the inspection on a hot day, UAV 302 can log and store the measured temperature at a particular geo-spatial location of the respective captured thermal images. This temperature information may be used to correct or account for variability in the temperature for the various locations where the UAV will obtain thermal sensor information of the solar panel(s).

UAV 302 can determine a viewing position for inspecting solar panel 304. UAV 302 can determine the viewing position based on one or more conditions. The conditions can include, for example, (1) the viewing position is sufficiently close to solar panel 304; (2) the viewing position is not directly in front of (e.g., perpendicular to) solar panel 304, to avoid interference from UAV 302; (3) the viewing position avoids sunlight directly reflected from solar panel 304 to avoid detecting false hot spots; (4) the view position allows an even image of solar panel, where every solar cell of the solar panel has approximately a same distance from UAV 302 to avoid uneven thermal measurement; and (5) a visible area of solar panel 304, in perspective from UAV 302, is maximized to maximize thermal image resolution.

In some implementations, UAV 302 can determine the viewing position based on emissivity of solar panel 304. The emissivity can indicate an ability of solar panel 304 to emit infrared energy. The emissivity can be highest in perpendicular direction 406 that is perpendicular to solar panel 304. The emissivity can decrease with an increasing angle away from perpendicular direction 406. UAV 302 can choose a viewing position that forms viewing angle 408. Viewing angle 408 can be an angle of 5°-60° (where 0° is perpendicular) from perpendicular direction 406 as a compromise for receiving as much reflected energy but not direct reflection, according to the conditions described above. In the example shown, solar panel 304 is a Sun-tracking panel that directly faces the Sun, where the Sun is in perpendicular direction 406. In various situations, a surface of solar panel 304 may not be perpendicular to a ray from the Sun. For fixed or variable-angled solar panels, the solar panel angle may be provided to the UAV for use in determining the viewing position.

A flight control system of UAV 302 can adjust attitude including roll, pitch and yaw of UAV 302 and position (e.g., altitude) of UAV 302 to ensure the viewing position satisfies the conditions described above. In some implementations, the flight control system of UAV 302 can adjust the attitude and altitude to maximize a ground sample distance (GSD) and sensor coverage area, to capture thermal images of as many solar panels as possible under acceptable resolution, to perform large-scale solar panel inspection (e.g., a survey of a solar farm where multiple solar panels are installed).

A job or flight package to inspect solar panel 304 can be associated with, and include installation specifics of the solar panel 304. The installation specifics can include solar panel dimensions (e.g., width and height) and orientation. The orientation can be represented by direction 406 that is perpendicular to a surface of solar panel 304, as a vector in a reference frame. The installation specifics can be uploaded to UAV 302. UAV 302 can adjust one or more control surfaces or one or more rotors to fly to the viewing position and to point a thermal sensor at solar panel 304. In some implementations, a thermal sensor on UAV 302 is mounted on a gimbal device. UAV 302 can adjust the orientation of the thermal sensor, such a thermal imaging camera, relative to body of UAV 302 for flexibility. UAV 302 can fly to a viewing position having an altitude that maximizes visible size of solar panel 304 in a view, or maximizes a number of solar panels 304 for inspection. UAV 302 can then align the thermal sensor to point at solar panel 304 while orienting UAV 302 to a different direction (e.g., a direction into the wind or a direction to a waypoint where a next solar panel for inspection is located).

Detecting Solar Panel Failures

FIG. 5 is a diagram illustrating example techniques of identifying irregularities of a solar panel based on thermal imaging. UAV 302 (of FIG. 3) or a server can determine whether there are any irregularities in a solar panel indicating that the solar panel is defective or otherwise not working according to specification of the solar panel. In some implementations, UAV 302 can upload captured thermal images of solar panels to a server. The server can be onboard UAV 302, or a cloud-based server. The server can normalize the thermal images to generate thermal map 308. The server can then determine the irregularities based on the thermal map 308. The log information of the UAV can be provided to the server, including the geo-spatial location of where a particular image was obtained, and the particular ambient temperature at the respective location.

The server can compare thermal map 308 with a previously generated thermal map of the same solar panel, or with a thermal map of another solar panel having the same configuration (e.g., number of cells, type of cells, size, and wiring), to determine if any anomaly is present in thermal map 308. Examples are described below and shown in FIG. 5. In the examples, different shades of cells represent different temperatures.

As an example, the server can compare thermal map 308A with thermal maps 502 and 504. Based on results of the comparison, the server can determine that, according to thermal map 308A, each solar cell of solar panel 304 is at least X1 degrees hotter than a corresponding cell represented in thermal maps 502 and 504, where X1 is a threshold. Accordingly, the server can determine that that the entire solar panel 304 is overheating. In response, the server can determine that solar panel 304 is not working according to the specification. The server can estimate that a cause of the overheating is a failure of the entire panel.

As an example, the server can compare thermal map 308B with thermal maps 502 and 504. Alternatively or additionally, the server can compare temperatures of solar cells, as represented in thermal map 308B, against one another. Based on results of the comparison, The server can determine that, according to thermal map 308B, a row (or column) of solar cells of solar panel 304 is at least X2 degrees hotter than a corresponding cell represented in thermal maps 502 and 504, or than other cells of thermal map 308B, where X2 is a threshold. Accordingly, the server can determine that the row (or column) of cells of solar panel 304 are overheating. In response, the server can determine that solar panel 304 is not working according to the specification. The server can estimate that a cause of the overheating is short circuit in that row or column of cells.

As another example, the server can compare thermal map 308C with thermal maps 502 and 504. Alternatively or additionally, the server can compare temperatures of solar cells, as represented in thermal map 308C, against one another. Based on results of the comparison, the server can determine that, according to thermal map 308C, multiple solar cell of solar panel 304 is at least X3 degrees hotter than a corresponding cell represented in thermal maps 502 and 504, or than other cells of thermal map 308C, where X3 is a threshold. In addition, the number of solar cells that are at least X3 degrees hotter exceeds a defective number threshold D1. In addition, the server can determine that these cells are randomly distributed. Accordingly, the server can determine that overheating cells are randomly distributed among solar panel 304. In response, the server can determine that solar panel 304 is not working according to the specification. The server can estimate that a cause of the overheating is a failure of the entire panel.

As another example, the server can compare thermal map 308D with thermal maps 502 and 504. Alternatively or additionally, the server can compare temperatures of solar cells, as represented in thermal map 308D, against one another. Based on results of the comparison, the server can determine that, according to thermal map 308D, a part of a particular solar cell is at least X4 degrees hotter than a corresponding cell represented in thermal maps 502 and 504, or than other cells of thermal map 308D, where X4 is a threshold. In response, the server can determine that solar panel 304 is not working according to the specification. The server can estimate that a cause is a rupture of the cell that is partially overheating.

As another example, the server can compare thermal map 308E with thermal maps 502 and 504. Alternatively or additionally, the server can compare temperatures of solar cells, as represented in thermal map 308E, against one another. Based on results of the comparison, the server can determine that, according to thermal map 308E, a part of solar panel 304 including multiple solar cells has an uneven heating pattern. In response, the server can determine that solar panel 304 is not working according to the specification. The server can estimate that a cause is a cell crack.

As another example, the server can compare thermal map 308F with thermal maps 502 and 504. Alternatively or additionally, the server can compare temperatures of solar cells, as represented in thermal map 308F, against one another. Based on results of the comparison, the server can determine that, according to thermal map 308F, one or more solar cell of solar panel 304 are at least X6 degrees hotter than a corresponding cell represented in thermal maps 502 and 504, where X6 is a threshold. In addition, the server can determine that the number of overheating cells do not reach a given threshold. For example, the server can determine that only a single cell is overheating. In response, the server can determine that solar panel 304 is not working according to the specification. The server can estimate that a cause is a failed cell, or is undetermined. In this example, as well as in the previous examples, the server can generate a report including a visual representation of thermal map 308, including thermal maps 308A through 308F, for further analysis.

Example Processes

Figure 6:
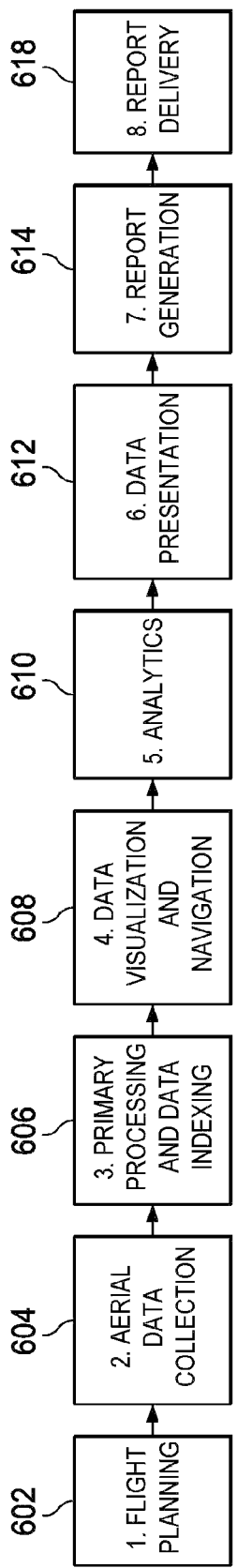
FIG. 6 is a flowchart illustrating example stages of solar panel inspection using a UAV, according to an embodiment.

FIG. 6 is a flowchart illustrating example stages of solar panel inspection using a UAV. The stages can be performed by a UAV, a cloud-based server, or both. In the example shown, UAV 302 inspects solar panel 304 according to a plan provided by FPS 200. The example stages disclosed below can be performed in the order described, or in other orders. In various implementations, omissions of some stages or additions of extra stages are possible.

In flight planning stage 602, a server can perform regulatory checks for inspecting solar panel 304. The regulatory checks can include determining whether UAV 302 shall fly around one or more areas when flying from a base station to a location of solar panel 304 based on a geographic database. The regulatory checks can include selecting flight time, altitude, and air speed based on a regulations database. Flight planning stage 602 can include granting authorization to view or control flight of UAV 302 to various users including, for example, solar panel inspection staff or an UAV operator. Flight planning stage 602 can include calculating flight times and number of flights based on selected vehicles (e.g., fixed-wing or rotary-wing UAVs), sensor packages (e.g., sensor lens focal length and aperture, sensor chip sensitivity, gimbaled or fixed sensor, etc.) and solar panels to inspect (e.g., a single installation or a solar farm including multiple solar panels, which will require multiple flights).

In aerial data collection stage 604, a thermal sensor (e.g., a radiometric camera) and a visible light camera (e.g., a full-frame interchangeable lens digital camera) mounted together as a sensor package on UAV 302 can allow dual acquisition of both thermal and visible light data in a flight. A computer onboard UAV 302 can execute an autonomous flight plan. The computer can determine a viewing position of UAV 302 and a sensor orientation. The computer can make the determination based on position of the Sun and the position and orientation of solar panel 304. The computer can detect reflections of heat sources that are not originated from parts of solar panel 304. In response, the computer can change the viewing position, the sensor orientation, or both, to avoid the reflected heat. The computer can actuate one or more control surfaces or rotors to have a low-altitude flight (e.g., a flight within X meters above solar panel 304) to capture a detailed thermal image for detecting anomalies or capture wind speed, or a high-altitude flight (e.g., above Y meters above solar panel 304) to capture a thermal image of multiple solar panels in a solar farm.

In some implementations, UAV 302 can go through a preflight check, where UAV 302 automatically tests one or more sensors or mechanics of UAV 302. A sensor (e.g., a light meter) can measure radiation from the Sun to determine whether solar radiation is above a threshold value (e.g., 650 watts per square meter) to allow the flight.

In primary processing and data indexing stage 606, UAV 302 can upload captured data including thermal images, and optionally, logs and stores including representations of environment factors that may affect the thermal images, to a server. The server can be a computer onboard UAV 302 or a cloud-based server. The server can generate geospatial data products, e.g., thermal and visible light orthomaps. The orthomaps can include thermal maps 308 or visible light maps, each orthorectified for uniform scale. The server can apply panchromatic sharpening to improve resolution of the orthomaps. The server can integrate additional data products with the sharpened orthomaps. The additional data products can include, for example, shape files defining each solar panel and other geographic data. The server can generate a composite data product having multiple layers. The server can link each pixel of a low-to-medium-resolution orthomap to a respective individual high-resolution image. In some implementations, the server can perform dynamic range adjustment to increase temperature differences within an orthomap or between orthomaps to improve clarity for analysis. The server can compute emissivity compensation (e.g., 0.85-0.90) for various types of solar panels (e.g., glass panels) to account for different panels' different ability to emit infrared energy.

In data visualization and navigation stage 608, the server can present visualized data to a user in various layers and combination of the layers. For example, The server can present visualized data in a thermal layer, a visible light layer, a solar panel configuration layer specifying dimensions of a solar panel, a solar panel location layer including one or more shapefiles, a map layer indicating geographic features around the solar panel, a satellite image layer including a satellite image of an area including the solar panel, a topo layer indicating topographic feature of the area including the solar panel, and an energy efficiency layer indicating predicted efficiency of each solar panel in a geographic area. The various layers are described in additional details below in reference to FIG. 7. The server can present each one of these layers, or each form of combination of the layers, in time series for comparison in data presentation stage 612.

In analytics stage 610, the server can perform various analysis on the orthorectified and normalized data. For example, the server can automatically detect anomalies of a solar panel from the orthorectified and normalized data. The server can perform differential analysis, including, for example, determining a ratio (e.g., a percentage) of solar panels or solar cells that failed since installation date. Determining the ratio of failure can be based on a minimum, maximum, or mean value of failed solar panels or cells and an area that includes a known or detected number of solar panels or cells. The server can determine a trend of failures growing over time. In addition, the server can receive user annotations on the data. The server can store the annotations in a database, and export the data including the annotations in a file or through an application program interface (API) to another system.

In report generation stage 614, the server can generate a report including the images, the analysis, and the annotations. The server can generate the report in various formats, e.g., as a thematic map, as entries in a relational or object-oriented database, or as a text or portable document format (PDF) document.

In report delivery stage 618, the server can deliver the report to a user or to other systems. For example, the server can deliver the report through an API call in the cloud, or present the report on a display screen or on a printer. The order of the stages can be in the order described above, or in other orders.

Figure 7:
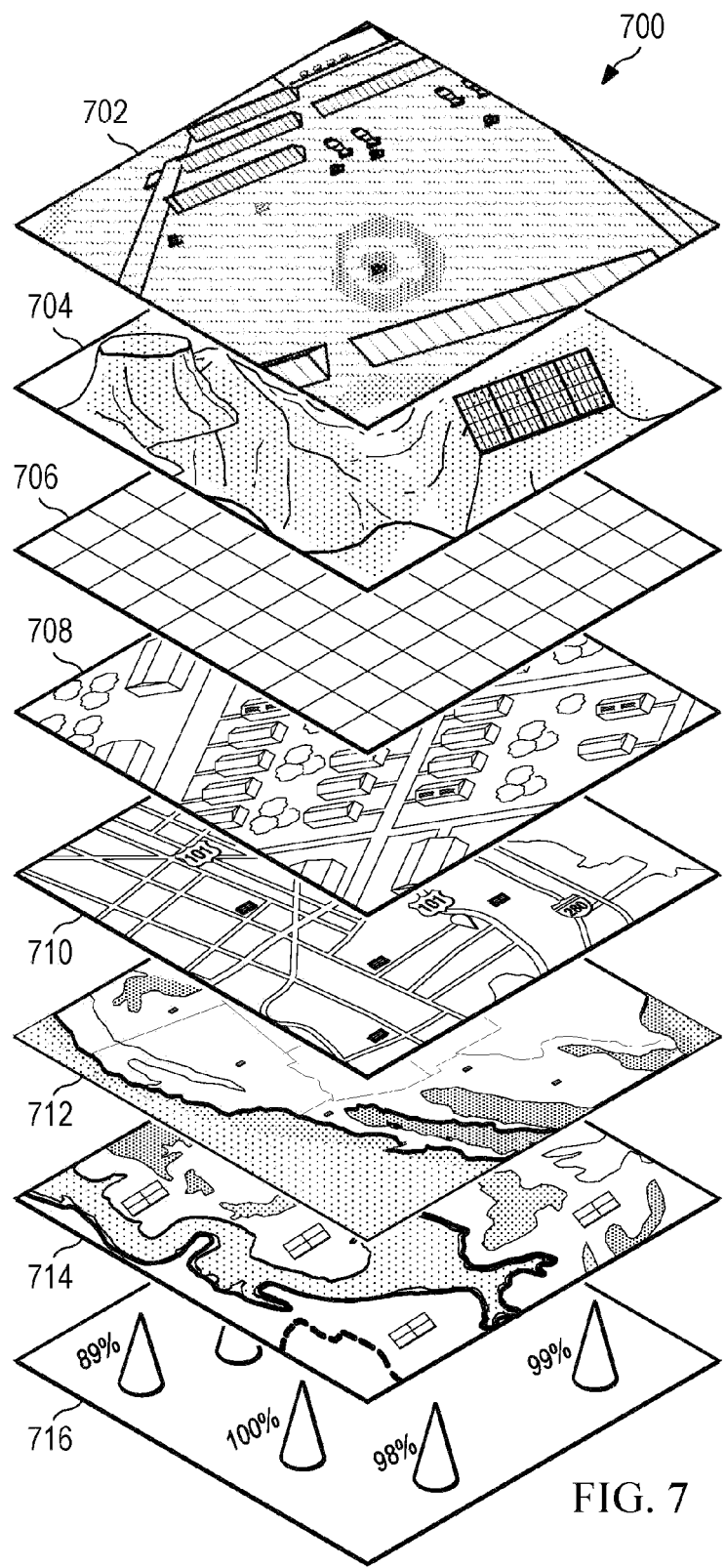
FIG. 7 is a diagram illustrating example techniques of analyzing panel inspection data using multiple layers of data, according to an embodiment.

FIG. 7 is a diagram illustrating example techniques of analyzing panel inspection data using multiple layers of data. A server onboard UAV 302 or in a cloud computing environment can present solar panel inspection data 700 in multiple layers. For example, the server can present thermal image layer 702, which can be an orthorectified thermal image of one or more solar panels. The server can present visible-light image layer 704, which can be an orthorectified image in visible light spectrum of the one or more solar panels. The server can present solar panel configuration layer 706, which can include scaled line images of one or more solar panels proportional to physical dimensions of the one or more solar panels. The server can present solar panel location layer 708 including one or more shapefiles designating locations, types and numbers of solar panels. The server can present map layer 710, indicating geographic features, e.g., buildings, streets, towers, cliffs or wind turbines around the solar panels. The server can present satellite image layer 712 including a satellite image of an area surrounding and including the solar panel. The server can present topo layer 714 indicating topographic features of the area surrounding and including the solar panel. Topo layer 714 can indicate a height of each solar panel. The server can present energy efficiency layer 716 indicating predicted efficiency of each solar panel. For example, the server can indicate that a solar panel is 100 percent efficient if no part of the solar panel failed, or 90 percent efficient, in case ten percent of solar cells of the solar panel failed. The server can present the layers for display, for print, for storage, or for input to an application program.

Example Processes of UAV Operations

Figure 8:
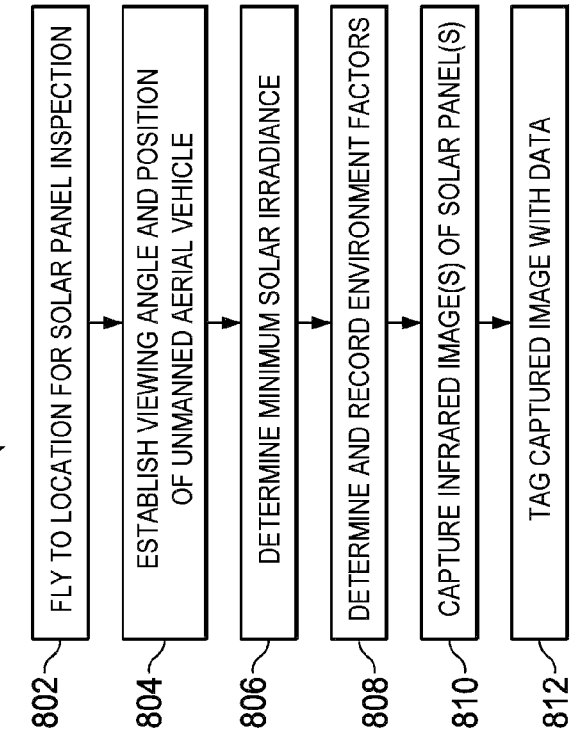
FIG. 8 is a flowchart illustrating an example process of solar panel inspection using a UAV, according to a first embodiment.

FIG. 8 is a flowchart illustrating example process 800 performed by a UAV, e.g., UAV 302 of FIG. 3 configured to inspect solar panel 304, according to a first embodiment. UAV 302 can fly (802) to a location for solar panel inspection at a given time. The location can be pre-programmed as part of a flight plan. UAV 302 can determine the time based on weather conditions including solar irradiation, clouds, wind speed and direction, and temperature.

UAV 302 can establish (804) a viewing position and a viewing angle for inspecting one or more solar panels. Establishing the viewing position and viewing angle can be based on the position of the Sun, the location of solar panel 304, and the orientation of solar panel 304 with respect a reference coordinate frame. Establishing the viewing angle can be based on the type of equipment carried by UAV 302 (e.g., whether cameras are gimballed). Establishing the viewing position and viewing angle can include maneuvering to the viewing position and pointing UAV 302 in a direction such that a thermal sensor onboard UAV 302 points at solar panel 304, or pointing a gimballed thermal sensor at solar panel 304.

UAV 302 can determine (806) whether a solar irradiance satisfies a minimum solar irradiance threshold. UAV 302 can designate the solar irradiance, if it satisfies the minimum solar irradiance threshold, as a baseline. The stage of determining whether the solar irradiance satisfies the minimum solar irradiance threshold can be performed at the viewing position, or preflight.

UAV 302 can determine and record (808) environment factors including cloudiness (e.g., irradiance values), wind speed, and temperature using one or more sensors of UAV 302, using information from a weather service, or using a combination of both. UAV 302 can capture (810) one or more thermal images (e.g., infrared images) of one or more solar panels to be inspected. UAV 302 can tag (812) the captured thermal images with data including the solar irradiance baseline and environment factors. UAV 302 can tag the thermal images with the environmental factors. UAV 302 can then determine whether any solar panel is defective based on the tagged thermal images, or submit the tagged thermal images to a server for further analysis.

In some implementations, UAV 302 can perform tiered inspection of solar panels. UAV 302 can fly at a first altitude designated as high altitude, and capture thermal images of multiple solar panels (e.g., solar panels in a solar farm). A server can perform a first tier analysis on the thermal images and determine whether one or more panels are abnormal (e.g., overheating). The server can determine if a second tier analysis is necessary based on the results of the first tier analysis, e.g., upon determining that one or more solar panels failed for unknown reasons. The server can instruct UAV 302 to perform a second tier analysis. UAV 302 can then fly at a second altitude that is closer to the one or more abnormal solar panels to capture close-up thermal images. From the close-up images, UAV 302 can determine whether the abnormality is caused by defects in the solar panels or by other environment factors (e.g., a reflection of an external heat source). Upon determining that the abnormality is caused by defects in the solar panels, the server can perform a second tier analysis to determine whether the abnormality is caused by one or more solar cells, by wiring, by short-circuit, or by other factors.

Figure 9:
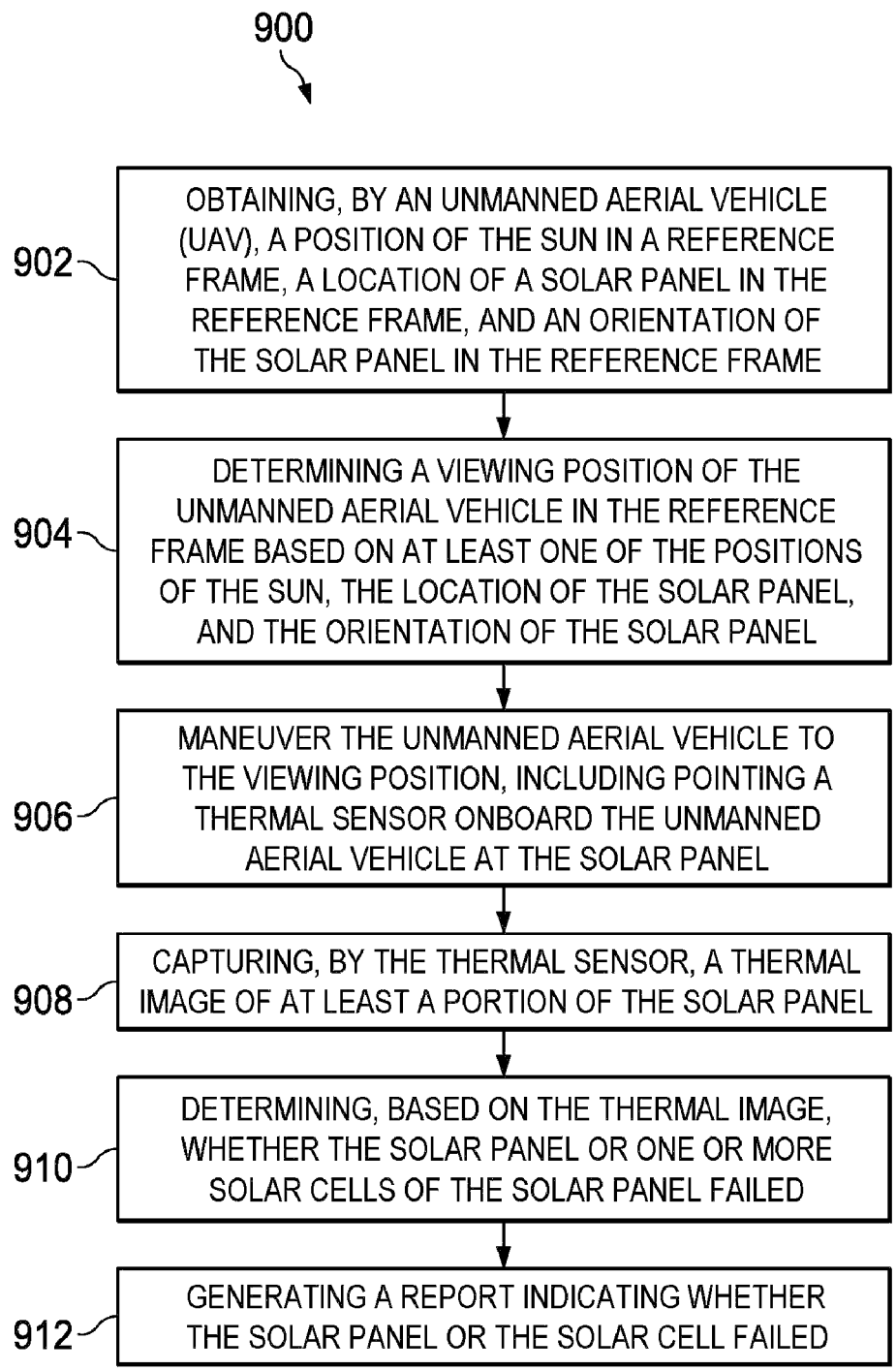
FIG. 9 is a flowchart illustrating an example process of solar panel inspection using a UAV, according to a second embodiment.

FIG. 9 is a flowchart illustrating example process 900 of solar panel inspection, in a second embodiment. Process 900 can be performed by a system including a UAV, e.g., UAV 302 of FIG. 3, and optionally, a server onboard UAV 302 or a cloud-based server coupled to UAV 302 through a communications network, e.g., a wireless communication network including a cellular data network, a wireless local area network (WLAN), a direct wireless link between UAV 302 and an Internet gateway, or any combination of the above. The server can include one or more computers.

UAV 302 can obtain (902) a position of the Sun in a reference frame, a location of a solar panel in the reference frame, and an orientation of the solar panel in the reference frame. The reference frame can be, for example, an Earth-Centered, Earth-Fixed (ECEF) reference coordinate frame, a geodetic reference coordinate frame, an East North Up (ENU) reference coordinate frame, another three-dimensional reference coordinate frame, or any combination of the above.

In some implementations, in a flight planning stage (e.g., flight planning stage 602), UAV 302, or the server, can select the solar panel from multiple solar panels from a solar farm according to a layout of the solar farm and a priority of inspecting the solar farm. UAV 302 or the server can determine a flight path over the solar farm. The flight path can be confined within a geographic boundary of the solar farm, and include respective viewing positions of inspecting each of the solar panels in the solar farm.

In some implementations, obtaining the position of the Sun can include obtaining a time of capturing the thermal image, including, for example, time of day and day of year. UAV 302 can obtain the time from a request for inspection, the request specifying the time, or from a clock that indicates the time the inspection occurs. UAV 302 can determine the position of the Sun based on the time, e.g., using a solar position database or using a solar position calculator.

In some implementations, obtaining the position of the Sun can include obtaining an image (e.g., visible light image) of the sky by the UAV. The image can capture a position of the Sun. UAV 302 can associate the image with the reference frame, based on an orientation of the camera taking the image, e.g., by converting the position of the Sun as captured into a position in the reference frame. UAV 302 can determine the position of the Sun in the reference frame based on the image, e.g., by correcting the position by the orientation of the camera.

UAV 302 can determine (904) a viewing position of the UAV in the reference frame based on at least one of the position of the Sun, the location of the solar panel, and the orientation of the solar panel. Determining the viewing position can include determining a UAV position (1) that is within a threshold distance from the location of the solar panel (e.g., X meters), and (2) that has a sensor viewing angle that avoids a direct reflection of the Sun from the solar panel. The viewing angle can be an angle that maximizes a viewing area of the solar panel without a direct reflection of UAV 302 from the solar panel or a direct reflection of the Sun. For example, the viewing angle can be an angle between five and 60 degrees ($\pi/36$ to $\pi/3$).

UAV 302 can maneuver (906) itself to the viewing position, including pointing a thermal sensor onboard UAV 302 at the solar panel. Maneuvering UAV 302 to the viewing position can include flying the UAV to the viewing position and maintaining the UAV at the viewing position. The maneuvering can be achieved by moving one or more control surfaces of UAV 302 or rotors of the UAV. Pointing the thermal sensor onboard UAV 302 at the solar panel can include determining a viewing angle from the view position to the solar panel and pointing the thermal sensor at the viewing angle using a gimbal device.

UAV 302 can capture (908), using the thermal sensor, a thermal image of at least a portion of the solar panel, e.g., by taking an infrared image of the solar panel. In some implementations, UAV 302 can determine that one or more environmental factors affect the thermal image. UAV 302 can tag the thermal image with a representation of the one or more environmental factors for correcting effects of the one or more environmental factors. For example, the one or more environmental factors can include shadows of clouds at least partially blocking the Sun. UAV 302 can capture an image of the sky including the clouds using a visible light camera. UAV 302 can tag the visible light image to the thermal image. For example, the one or more environmental factors can include at least one of a wind speed or a temperature. UAV 302 can record the environmental factors using an anemometer or a thermometer, or download the environmental factors from a cloud-based service. UAV 302 can tag the environmental factors to the thermal image. The one or more environmental factors can include a heat source (e.g., a nearby building having mirror-like surfaces) reflected by the solar panel. UAV 302 can capture a thermal or visible light image of the heat source and tag the thermal image with the image of the heat source.

UAV 302 can submit the captured thermal image, along with any tags, to the server for post-capture processing. The server can determine (910), based on the thermal image and any associated tags, whether the solar panel or one or more solar cells of the solar panel failed. For example, the server can compare the thermal image with one or more thermal images of one or more other thermal panels. The server can determine that the solar panel failed upon determining that a difference between thermal energies represented in the thermal image and thermal energies represented in the one or more other thermal image exceeds a panel fail threshold.

For example, the server can determine, based on the thermal image and associated tags, that thermal energy of a solar cell of the solar panel exceeds thermal energies of one or more other solar cells of the solar panel by at least a threshold difference amount. In response, the server can determine that at the solar cell of the solar panel failed. For example, the server can determine, based on the thermal image and associated tags, that a string of solar cells of the solar panel are overheating by a threshold amount (e.g., X degrees). In response, the server can determine that the string of solar cells failed, e.g., due to short circuit.

For example, the server can determine, based on the thermal image and associated tags, that at least a threshold number of overheating cells are randomly distributed in the solar panel. In response, the server can determine that the string of solar cells failed. For example, the server can determine, based on the thermal image and associated tags, that a part of a solar cell of the solar panel is overheating. In response, the server can determine that the overheating solar cell failed, e.g., due to a rupture. For example, the server can determine, based on the thermal image and associated tags, that a portion of the solar panel including multiple solar cells is overheating. In response, the server can determine that the solar panel failed, e.g., due to one or more cracks at the portion of the solar panel.

The server can generate (912) a report indicating whether the solar panel or the solar cell failed. The server can feed the report to a report processing program through an API, store the report on a storage device, or present the report to solar panel inspection staff as a printout or on a display surface.

Example Processes of EPS Operations

Figure 10:
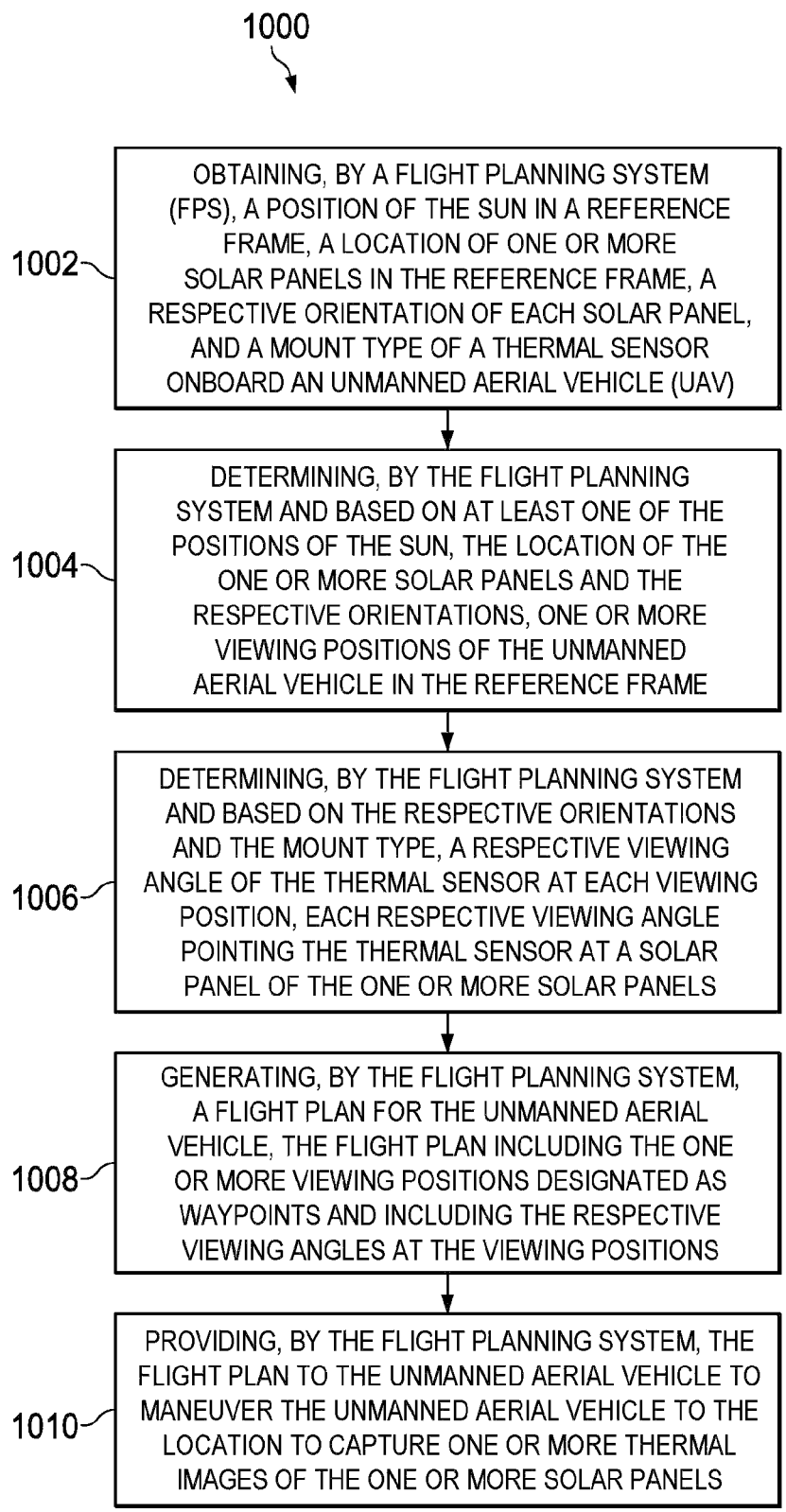
FIG. 10 is a flowchart illustrating an example process of generating a flight plan for a UAV for performing solar panel inspection, according to an embodiment.

FIG. 10 is a flowchart illustrating example process 1000 of generating a flight plan for a UAV for performing solar panel inspection, according to an embodiment. Process 900 can be performed by FPS 200 of FIG. 2

FPS 200 can obtain (1002) a position of the Sun in a reference frame, a location of one or more solar panel in the reference frame, a respective orientation of each solar panel, and a mount type of a thermal sensor onboard a UAV. Obtaining the position of the Sun can include obtaining, by FPS 200, a time of capturing the thermal images, and determining the position of the Sun based on the time. Obtaining the time of capturing the thermal images can include receiving, by FPS 200, weather information from a weather service. The weather information can include cloudiness at various time periods (e.g., sunny at 8-9 am, overcast at 9-10 am, etc.), wind speeds at various time periods (e.g., 5 kilometers per hour at 8-9 am, etc.), and ambient temperatures at various time periods. FPS 200 can select a time that maximizes thermal image contrast from the various time periods based on the cloudiness, wind speeds, and ambient temperatures as the time of capturing the images. For example, FPS 200 can select a time that is designated as sunny, has wind speed of under X kilometers per hour, and has an ambient temperature of below 40 degree Celsius.

FPS 200 can determine (1004), based on at least one of the position of the Sun, the location of the one or more solar panels and the respective orientations, a respective viewing position of the UAV in the reference frame for capturing respect thermal images of each solar panel.

FPS 200 can determine (1006), based on the respective orientations and the mount type, a respective viewing angle of the thermal sensor at each viewing position. Each respective viewing angle can point the thermal sensor at a solar panel of the one or more solar panels from a corresponding viewing position. For example, upon determining that the mount type is a fixed type, where the thermal sensor is fixed to body of the UAV, FPS 200 can determine the respective viewing angles by determining an orientation of the UAV in the reference frame at which the thermal sensor points at a solar panel. Likewise, upon determining that the mount type is a gimballed type, FPS 200 can determine the respective viewing angles by determining an orientation of the thermal sensor relative to the UAV at which the thermal sensor points at a solar panel while the UAV is heading from a waypoint to a next waypoint.

FPS 200 can generate (1008) a flight plan for the UAV. The flight plan can include the one or more viewing positions designated as waypoints. The flight plan can include the respective viewing angles at the viewing positions. The one or more solar panels can be solar panels of a solar farm. FPS 200 can generate the flight plan by determining a flight path on which the UAV captures thermal images of the solar panels according to a layout of the solar farm. For example, FPS 200 can generate a UAV flight path that follows rows, columns, or circles of solar panels of a solar farm.

In some implementations, FPS 200 can generate flight plan by performing the following operations. FPS 200 can generate a flight path for the flight plan that is above a first altitude over the solar farm and first tier instructions for performing a first tier inspection of the solar farm by the UAV. The first tier inspection can include capturing a thermal image of a plurality of solar panels. FPS 200 can generate contingency flight instructions for performing a second tier inspection of the solar farm by the UAV. The second tier inspection can include capturing a thermal image of an individual solar panel of the solar farm at a second altitude that is lower than the first altitude. FPS 200 can program the second tier inspection to be contingent upon identifying a suspected panel failure detected in the first tier inspection. FPS 200 can designate the first flight path, the first tier instructions, and the second tier instructions as at least a portion of the flight path.

In some implementations, FPS 200 can generate flight plan by performing the following operations. FPS 200 can obtain flight restriction data from a flight regulation database. The flight restriction data can include information indicating that an airspace is designated as a restricted zone. FPS 200 can generate a flight plan to include a flight path that avoids the restricted zone.

FPS 200 can provide (1010) the flight plan to the UAV to maneuver the UAV to the location to capture one or more thermal images of the one or more solar panels. For example, FPS 200 can store the flight plan on a storage device, which can be downloaded to the UAV at a later time.

The processes and operations are described above in terms of one or more processors. The processor or processors can be onboard a UAV, onboard a user device, or part of a cloud-based processing system. In particular, a user device can be designated as a GCS and perform functions of a GCS. A user device and a UAV computer system can be designated as a FPS and perform functions of an FPS. Likewise, functions of both the GCS and FPS can be performed by a cloud-based processing system.

While the above discussion focuses primarily on a single user device or GCS for determining a visual line of sight interruption, multiple user devices or GCS devices that may communicate with the UAV can be used to determine a beyond visual line of sight occurrence. For example, a primary operator can control the UAV with a GCS, and one or more additional devices that are in communication with the UAV (or directly with the GCS) can cooperatively operate to determine if the UAV is beyond visual line of sight of each or all of the devices. So long as the UAV is determined to be within visual line of sight of at least one of the devices using the techniques described herein, then a contingency event would not be generated. For example, the UAV could receive a base location from a primary operator's GCS and a spotter's user device. The primary operator could be positioned at a location where the operator's GCS may lose visual line of sight of the UAV. However, the spotter's user device may also provide a base location to the UAV, or transmit the base location to the operator's GCS. If the visual line of sight between UAV's in-flight geo-spatial location and at least one of the devices (e.g., the user device or GCS), the UAV would be considered to be within visual line of sight, and no contingency operation would be initiated. However, if the UAV's visual line of sight for both the operator's GCS and the user device is interrupted, then a contingency operation would be conducted as described herein.

Various types of UAVs may be used to implement the inventions described herein (for example, a fixed wing airplane, helicopter, a multi-rotor vehicle (e.g., a quadcopter in single propeller and coaxial configurations), a vertical takeoff and landing vehicle, lighter than air aircraft). A multi-rotor vehicle in a coaxial configuration may use the same propeller pitch and diameter propellers, use different pitch and diameter propellers, or variable pitch propellers. In this specification, UAVs, such as drones, un-operated aerial vehicles, remotely operated aircraft, unmanned aircraft systems, any aircraft covered under Circular 328 AN/190 classified by the International Civil Aviation Organization, and so on. In addition, certain aspects of the disclosure can be utilized with other types of unmanned vehicles (e.g., wheeled, tracked, and/or water vehicles). Sensors, which are included in the general term payload (e.g., any hardware, software, module, and so on, that is not critical to the flight operation of the UAV), can include any device that captures real-world information, including cameras, radiation measuring instruments, distance detectors such as Lidar, and so on.

Each of the processes, methods, instructions, applications and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid-state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smartphone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a toolbar, a pop up menu, interactive voice response system, or otherwise.

In general, the terms "engine" and "module" as used herein refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital videodisc, flash drive, or any other tangible medium. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic data sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood within the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Nothing in the description is intended to imply that any particular element, feature, characteristic, step, module or block is necessary or indispensable. The novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of the disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   determining, based on a reference frame captured using a camera of an unmanned aerial vehicle, viewing positions of the unmanned aerial vehicle for inspecting one or more solar panels;
   determining, based on the viewing positions, viewing angles for a thermal sensor of the unmanned aerial vehicle relative to the one or more solar panels;
   determining, based on the viewing angles, a flight plan for the unmanned aerial vehicle to use to inspect the one or more solar panels; and
   directing the unmanned aerial vehicle to inspect the one or more solar panels in accordance with the flight plan.

2. The method of claim 1, wherein determining the viewing positions of the unmanned aerial vehicle for inspecting the one or more solar panels comprises:
   determining, based on the reference frame, a position of the sun;
   determining, based on the reference frame, a location of each of the one or more solar panels; and
   determining the viewing positions based on the position of the sun and the location of each of the one or more solar panels.

3. The method of claim 2, wherein determining the position of the sun comprises:
   determining the position of the sun based on a time at which the reference frame is captured.

4. The method of claim 1, wherein determining the viewing angles for the thermal sensor comprises:
   determining the viewing angles based on a mount type of the thermal sensor and an orientation of each of the one or more solar panels.

5. The method of claim 4, wherein, where the mount type of the thermal sensor is a fixed type, determining the viewing angles based on the mount type and the orientation of each of the one or more solar panels comprises:
   determining orientations of the unmanned aerial vehicle in the reference frame at which the thermal sensor points respective ones of the one or more solar panels.

6. The method of claim 4, wherein, where the mount type of the thermal sensor is a gimballed type, determining the viewing angles based on the mount type and the orientation of each of the one or more solar panels comprises:
   determining orientations of the thermal sensor at which the thermal sensor points respective ones of the one or more solar panels while the unmanned aerial vehicle navigates between waypoints.

7. The method of claim 1, wherein the one or more solar panels are of a solar farm, and wherein determining the flight plan for the unmanned aerial vehicle to use to inspect the one or more solar panels comprises:
   determining a flight path for the unmanned aerial vehicle to capture images of the one or more solar panels according to a layout of the solar farm.

8. The method of claim 7, wherein the viewing positions represent waypoints for the unmanned aerial vehicle to navigate to along the flight path.

9. The method of claim 7, wherein determining the flight path according to the layout of the solar farm comprises:
   generating first instructions for performing a first tier inspection of the solar farm above a first altitude; and
   generating second instructions for performing a second tier inspection of the solar farm at a second altitude that is lower than the first altitude.

10. The method of claim 9, wherein the second instructions are contingent upon a detection of a suspected panel failure during the first tier inspection.

11. The method of claim 7, wherein determining the flight path according to the layout of the solar farm comprises:
    obtaining, from a flight regulation database, flight restriction data indicating that an airspace is designated as a restricted zone, wherein the flight path avoids the restricted zone.

12. The method of claim 1, wherein determining the flight plan for the unmanned aerial vehicle to use to inspect the one or more solar panels comprises:
    updating the flight plan based on at least one of the viewing angles or the viewing positions.

13. An apparatus, comprising:
    one or more processors; and
    one or more non-transitory storage media storing instructions that, when executed by the one or more processors, cause the one or more processors to:
      determine, based on a reference frame, viewing positions of an unmanned aerial vehicle for an inspection of one or more solar panels;
      determine, based on the viewing positions, a flight plan for the inspection of the one or more solar panels; and
      direct the unmanned aerial vehicle to inspect the one or more solar panels in accordance with the flight plan.

14. The apparatus of claim 13, wherein, to determine the flight plan for the inspection of the one or more solar panels, the one or more processors are configured to execute the instructions to:
    determine, based on the viewing positions, viewing angles for a thermal sensor of the unmanned aerial vehicle relative to the one or more solar panels; and
    determine the flight plan based on the viewing angles.

15. The apparatus of claim 14, wherein the viewing angles are based on a mount type of the thermal sensor.

16. The apparatus of claim 13, wherein the one or more processors are configured to execute the instructions to:
    transmit a flight package representative of the flight plan to a user device in communication with the unmanned aerial vehicle.

17. A system, comprising:
    a flight planning system configured to:
      determine viewing positions for an inspection of one or more solar panels based on a reference frame;
      determine viewing angles relative to the one or more solar panels based on the viewing positions; and
      determine a flight plan for the inspection of the one or more solar panels based on the viewing positions and the viewing angles; and
    an unmanned aerial vehicle configured to:
      receive the flight plan from the flight planning system; and perform the inspection of the one or more solar panels according to the flight plan.

18. The system of claim 17, wherein the viewing positions are determined based on a position of the sun, and wherein the viewing angles are determined based on a mount type of a thermal sensor of the unmanned aerial vehicle.

19. The system of claim 17, wherein, to determine the flight plan for the inspection of the one or more solar panels based on the viewing positions and the viewing angles, the flight planning system is configured to:
update a pre-existing flight plan based on the viewing positions and the viewing angles to determine the flight plan.

20. The system of claim 17, wherein, to perform the inspection of the one or more solar panels according to the flight plan, the unmanned aerial vehicle is configured to:
navigate to waypoints indicated in the flight plan; and
at each of the waypoints, capture one or more thermal images of a solar panel of the one or more solar panels.

\* \* \* \* \*